United States Patent
Go et al.

(10) Patent No.: US 12,531,609 B2
(45) Date of Patent: Jan. 20, 2026

(54) METHOD AND DEVICE FOR TRANSMITTING AND RECEIVING SOUNDING REFERENCE SIGNAL IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 17/912,750

(22) PCT Filed: Mar. 17, 2021

(86) PCT No.: PCT/KR2021/095033
§ 371 (c)(1),
(2) Date: Sep. 19, 2022

(87) PCT Pub. No.: WO2021/187967
PCT Pub. Date: Sep. 23, 2021

(65) Prior Publication Data
US 2023/0147639 A1    May 11, 2023

(30) Foreign Application Priority Data
Mar. 20, 2020    (KR) .................... 10-2020-0034623

(51) Int. Cl.
*H04B 7/06*    (2006.01)
*H04L 5/00*    (2006.01)
*H04W 8/24*    (2009.01)

(52) U.S. Cl.
CPC ......... *H04B 7/061* (2013.01); *H04B 7/06956* (2023.05); *H04W 8/24* (2013.01); *H04L 5/0048* (2013.01)

(58) Field of Classification Search
CPC ... H04L 5/0051; H04L 5/0048; H04L 5/0053; H04L 5/0094; H04L 5/0023; H04L 5/005;
(Continued)

(56) References Cited

U.S. PATENT DOCUMENTS

2019/0253214 A1    8/2019  Liu et al.
2019/0356445 A1*  11/2019  Manolakos .......... H04B 7/0805
(Continued)

FOREIGN PATENT DOCUMENTS

WO    2020/056180 A1    3/2020

OTHER PUBLICATIONS

NEC, "[Draft] Correction for Higher Layer Parameter Alignment", R1-1902198, 3GPP TSG RAN WG1 #96, Athens, Greece, Feb. 14, 2019, See Section 6.2.1, 6.2.1.2.
(Continued)

Primary Examiner — Golam Sorowar
(74) Attorney, Agent, or Firm — BRYAN CAVE LEIGHTON PAISNER LLP

(57) ABSTRACT

Disclosed are a method and device for transmitting and receiving sounding reference signal in a wireless communication system. A method for transmitting a physical uplink shared channel (PUSCH) according to an embodiment of the present disclosure may comprise the steps of: transmitting, to a base station, terminal capability information related to antenna switching; receiving configuration information related to an SRS from the base station; and transmitting the SRS to the base station to the basis of the configuration information. The configuration information may include information about a plurality of SRS resource sets, the usage (Continued)

of which has been set to antenna switching, and antenna port information about the plurality of SRS resource sets.

11 Claims, 12 Drawing Sheets

(58) Field of Classification Search
CPC ... H04L 5/0057; H04L 25/0226; H04L 5/001; H04L 5/0044; H04L 5/0091; H04L 5/0055; H04L 1/08; H04L 5/0005; H04L 1/1861; H04L 5/0035; H04L 25/0224; H04L 5/00; H04L 1/00; H04L 1/1864; H04W 72/23; H04W 72/1268; H04W 16/28; H04W 72/046; H04W 72/21; H04W 52/146; H04W 72/0446; H04W 8/24; H04W 52/242; H04W 24/10; H04W 72/1273; H04W 52/42; H04W 52/325; H04W 72/04; H04W 52/14; H04B 7/0695; H04B 7/0404; H04B 7/0456; H04B 7/0626; H04B 7/0628; H04B 7/088; H04B 7/0639; H04B 7/024; H04B 7/0691; H04B 7/0408; H04B 7/0617; H04B 7/06; H04B 7/0417; H04B 17/373; H04B 7/0478; H04B 17/318; H04B 7/00; H04B 7/043; H04B 7/0615; H04B 7/063
See application file for complete search history.

(56) References Cited

U.S. PATENT DOCUMENTS

| | | | | |
|---|---|---|---|---|
| 2020/0177353 A1* | 6/2020 | Ding | ................... | H04L 5/005 |
| 2020/0252241 A1* | 8/2020 | Park | ................... | H04L 25/0224 |
| 2020/0313816 A1* | 10/2020 | Sun | ................... | H04L 27/2607 |
| 2021/0112498 A1* | 4/2021 | Duan | ................... | H04L 5/0023 |
| 2022/0239440 A1* | 7/2022 | Go | ................... | H04L 5/0091 |
| 2022/0239453 A1* | 7/2022 | Matsumura | ................... | H04L 5/0098 |
| 2022/0295299 A1* | 9/2022 | Park | ................... | H04B 7/0404 |
| 2022/0304018 A1* | 9/2022 | Ko | ................... | H04W 74/0833 |
| 2023/0188285 A1* | 6/2023 | Wang | ................... | H04B 7/088 |

OTHER PUBLICATIONS

ZTE, "Discussion on Additional SRS Symbols", R1-1911934, 3GPP TSG RAN WG1 #99, Reno, USA, Nov. 9, 2019 See Section 2.1; and Figure 2.2.

LG Electronics, "Discussion on Multi-Beam Based Operations and Enhancements", R1-1906731, 3GPP TSG RAN WG1 #96, Athens, Greece, May 4, 2019, See Section 2.2.

Lenovo, et al., "Discussion of multi-beam operation", 3GPP TSG RAN WG1 Meeting #97, R1-1908721, Reno, USA, May 13-17, 2019.

* cited by examiner (a)

(b)

METHOD AND DEVICE FOR TRANSMITTING AND RECEIVING SOUNDING REFERENCE SIGNAL IN WIRELESS COMMUNICATION SYSTEM

CROSS-REFERENCE TO RELATED APPLICATIONS

This application is the National Stage filing under 35 U.S.C. § 371 of International Application No. PCT/KR2021/095033, filed on Mar. 17, 2021, which claims the benefit of Korean Patent Application No. 10-2020-0034623, filed on Mar. 20, 2020, the contents of which are all hereby incorporated by reference herein in their entirety.

TECHNICAL FIELD

The present disclosure relates to a wireless communication system, and in more detail, relates to a method and an apparatus of transmitting and receiving a sounding reference signal (SRS) in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving a sounding reference signal.

In addition, an additional technical object of the present disclosure is to provide a method and an apparatus for transmitting and receiving a sounding reference signal for antenna switching to obtain downlink channel information.

The technical objects to be achieved by the present disclosure are not limited to the above-described technical objects, and other technical objects which are not described herein will be clearly understood by those skilled in the pertinent art from the following description.

Technical Solution

A method of transmitting a sounding reference signal (SRS) in a wireless communication system-may include: transmitting, to a base station, terminal capability information related to antenna switching; receiving, from the base station, configuration information related to an SRS; and transmitting, to the base station, the SRS based on the configuration information. The configuration information may include information on a plurality of SRS resource sets in which usage is configured as the antenna switching, and the configuration information may include information on antenna ports for the plurality of SRS resource sets.

A terminal transmitting a sounding reference signal (SRS) according to an additional aspect of the present disclosure may include at least one transceiver for transmitting and receiving a wireless signal and at least one processor controlling the at least one transceiver. The at least one processor may be configured to: transmit, to a base station, terminal capability information related to antenna switching; receive, from the base station, configuration information related to an SRS; and transmit, to the base station, the SRS based on the configuration information. The configuration information may include information on a plurality of SRS resource sets in which usage is configured as the antenna switching, and the configuration information may include information on antenna ports for the plurality of SRS resource sets.

In at least one non-transitory computer-readable medium storing at least one instruction, the at least one instruction executable by at least one processor may control a device of transmitting a sounding reference signal (SRS) to: transmit, to a base station, terminal capability information related to antenna switching; receive, from the base station, configuration information related to an SRS; and transmit, to the base station, the SRS based on the configuration information. The configuration information may include information on a plurality of SRS resource sets in which usage is configured as the antenna switching, and the configuration information may include information on antenna ports for the plurality of SRS resource sets.

A processing apparatus configured to control a terminal of transmitting a sounding reference signal (SRS) in a wireless communication system may include at least one processor; and at least one computer memory operably connected to the at least one processor and storing instructions that, based on being executed by the at least one processor, perfume operations. The operations may include: transmitting, to a base station, terminal capability information related to antenna switching; receiving, from the base station, configuration information related to an SRS; and transmitting, to the base station, the SRS based on the configuration information. The configuration information may include information on a plurality of SRS resource sets in which usage is configured as the antenna switching, and the configuration information may include information on antenna ports for the plurality of SRS resource sets.

A method of receiving a sounding reference signal (SRS) in a wireless communication system may include: receiving, from a terminal, terminal capability information related to antenna switching; transmitting, to the terminal, configuration information related to an SRS; and receiving, from the terminal, the SRS based on the configuration information. The configuration information may include information on a plurality of SRS resource sets in which usage is configured as the antenna switching, and the configuration information may include information on antenna ports for the plurality of SRS resource sets.

A base station receiving a sounding reference signal (SRS) according to an additional aspect of the present disclosure may include at least one transceiver for transmitting and receiving a wireless signal and at least one processor controlling the at least one transceiver. The at least one processor may be configured to: receive, from a terminal, terminal capability information related to antenna switching; transmit, to the terminal, configuration information related to an SRS; and receive, from the terminal, the SRS based on the configuration information. The configuration information may include information on a plurality of SRS resource sets in which usage is configured as the antenna switching, and the configuration information may include information on antenna ports for the plurality of SRS resource sets.

Advantageous Effects

According to an embodiment of the present disclosure, it is possible to effectively obtain downlink channel state information for a terminal in which the number of transmission antennas (Tx antenna) is less than the number of reception antennas (Rx antenna).

In addition, according to an embodiment of the present disclosure, specifically, more than 4 reception antennas (Rx antenna) can effectively support an antenna switching operation for a terminal.

In addition, according to an embodiment of the present disclosure, in a multi-panel terminal, an antenna switching operation in consideration of a panel switching delay can be effectively supported.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
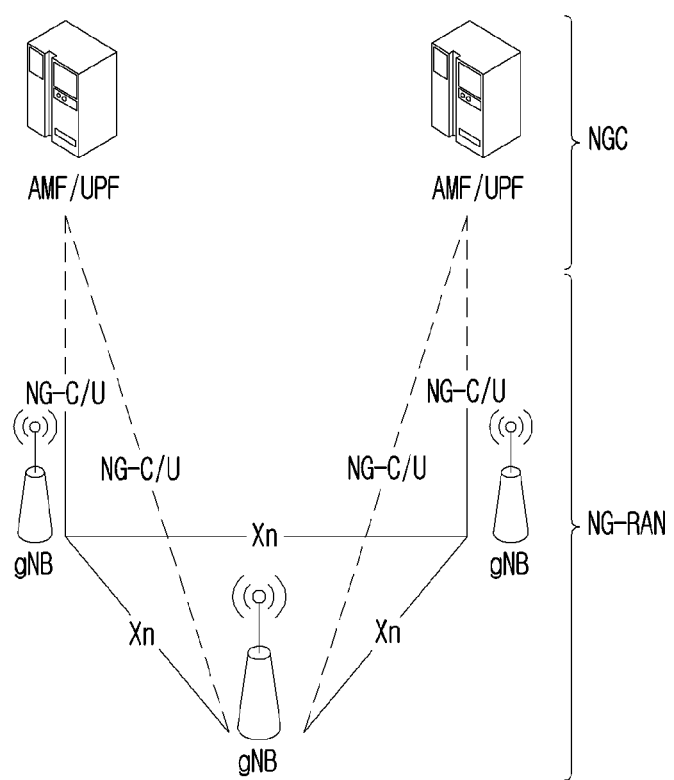
FIG. 1 illustrates a structure of a wireless-communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point (AP), a Network (5G network), an AI (Artificial Intelligence) system/module, an RSU(road side unit), a robot, a drone(UAV: Unmanned Aerial Vehicle), an AR (Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS (Mobile Subscriber Station), an SS (Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
 BM: beam management
 CQI: Channel Quality Indicator
 CRI: channel state information—reference signal resource indicator
 CSI: channel state information
 CSI-IM: channel state information—interference measurement
 CSI-RS: channel state information—reference signal
 DMRS: demodulation reference signal
 FDM: frequency division multiplexing
 FFT: fast Fourier transform
 IFDMA: interleaved frequency division multiple access
 IFFT: inverse fast Fourier transform
 L1-RSRP: Layer 1 reference signal received power
 L1-RSRQ: Layer 1 reference signal received quality
 MAC: medium access control
 NZP: non-zero power
 OFDM: orthogonal frequency division multiplexing
 PDCCH: physical downlink control channel
 PDSCH: physical downlink shared channel
 PMI: precoding matrix indicator
 RE: resource element
 RI: Rank indicator
 RRC: radio resource control
 RSSI: received signal strength indicator
 Rx: Reception
 QCL: quasi co-location
 SINR: signal to interference and noise ratio
 SSB (or SS/PBCH block): Synchronization signal block (including PSS (primary synchronization signal), SSS (secondary synchronization signal) and PBCH (physical broadcast channel))
 TDM: time division multiplexing
 TRP: transmission and reception point
 TRS: tracking reference signal
 Tx: transmission
 UE: user equipment
 ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, Substitute Specification-Clean a corresponding technology-is referred to as NR in the present disclosure. NR is an expression which represents an example of a 5G RAT.

A new RAT-system including NR uses an OFDM transmission method or a transmission method similar to it. A new RAT system may follow OFDM parameters different from OFDM parameters of LTE. Alternatively, a new RAT system follows a numerology of the existing. LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF (User Plane Function) through an N3 interface.

Figure 2:
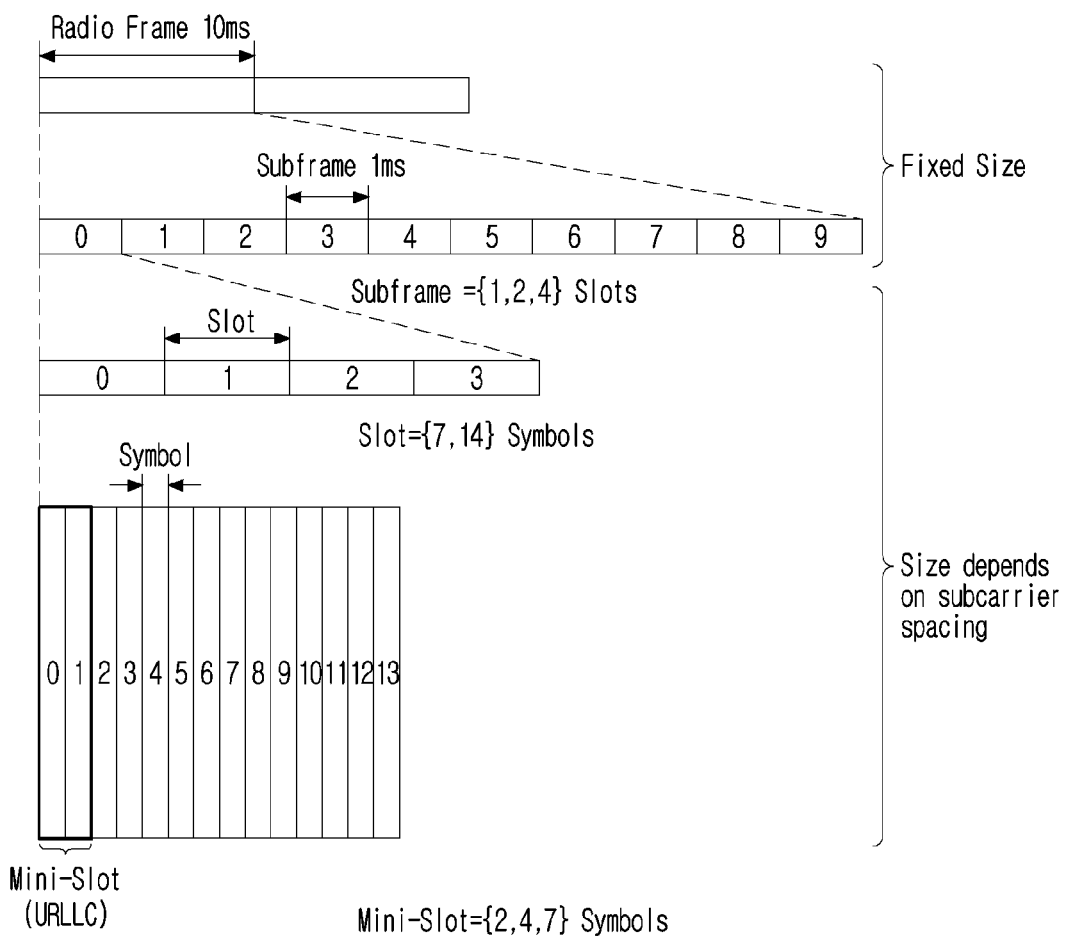
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. 1 from a terminal should start earlier by $T_{TA}=(N_{TA}+N_{TA,offset})$ To than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2, 4}slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
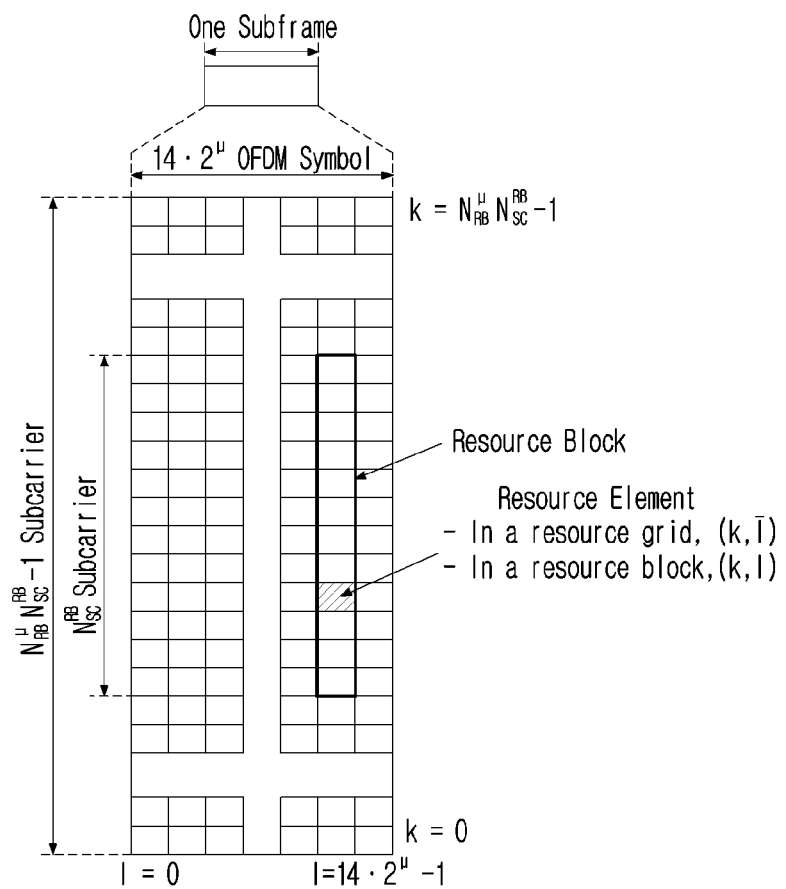
FIG. 3 illustrates a resource grid in a wireless communication system to which the present. disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with 14.21 OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, k=0, ..., $N_{RB}^{\mu} N_{sc}^{RB}-1$ is an index in a frequency domain and l'=0, ..., $2^{\mu} N_{symb}^{(\mu)}-1$ refers to a position of a symbol in a subframe. When referring to a resource element in a slot, an index pair (k,l) is used. Here, l=0, ..., $N_{symb}^{\mu}-1$. A resource element (k,1') for p and an antenna port p corresponds to a complex value, $a_{k,l'}^{(p,\mu)}$. When there is no risk of confusion or when a specific antenna port or numerology is not specified, indexes p and µ may be dropped, whereupon a complex value may be $a_{k,l'}^{(p)}$ or $a^{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration µ is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
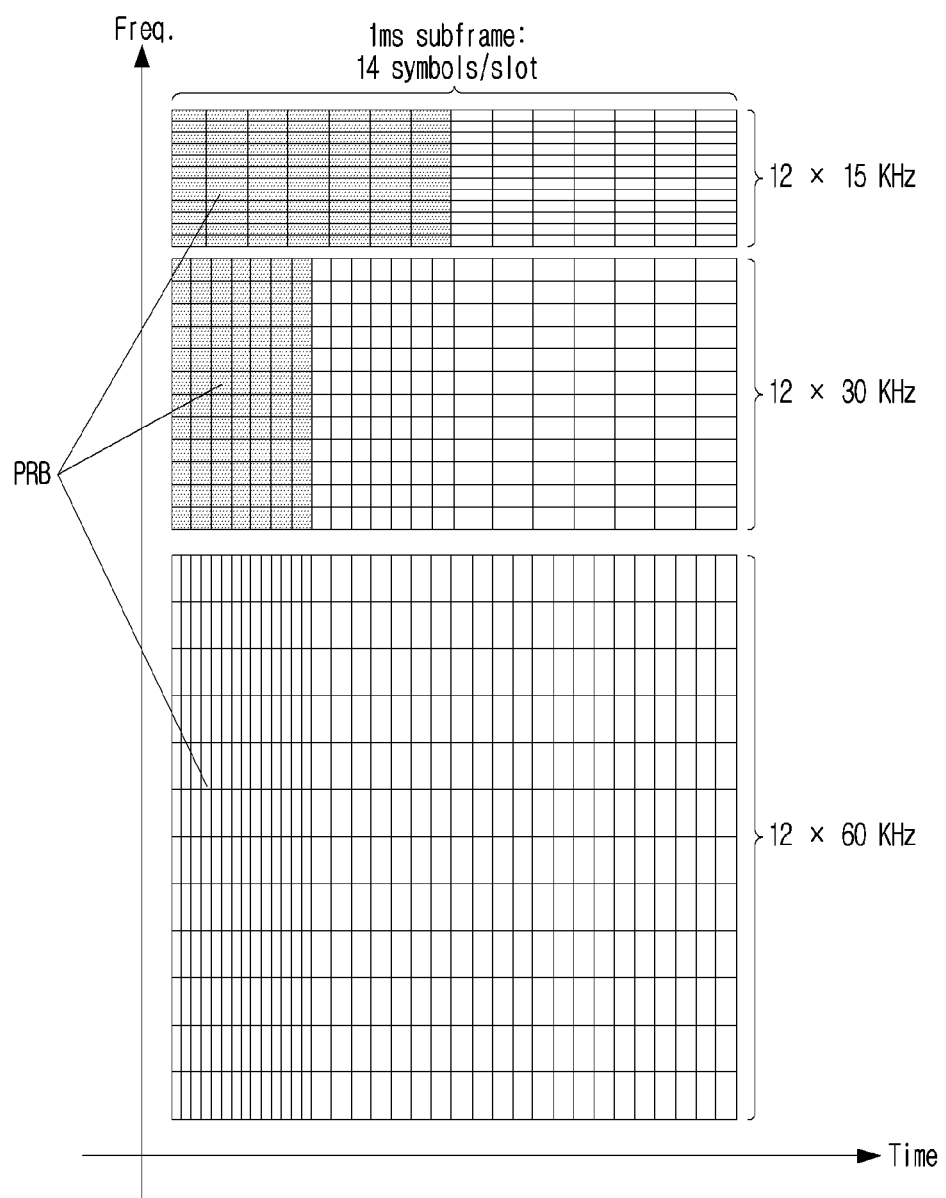
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
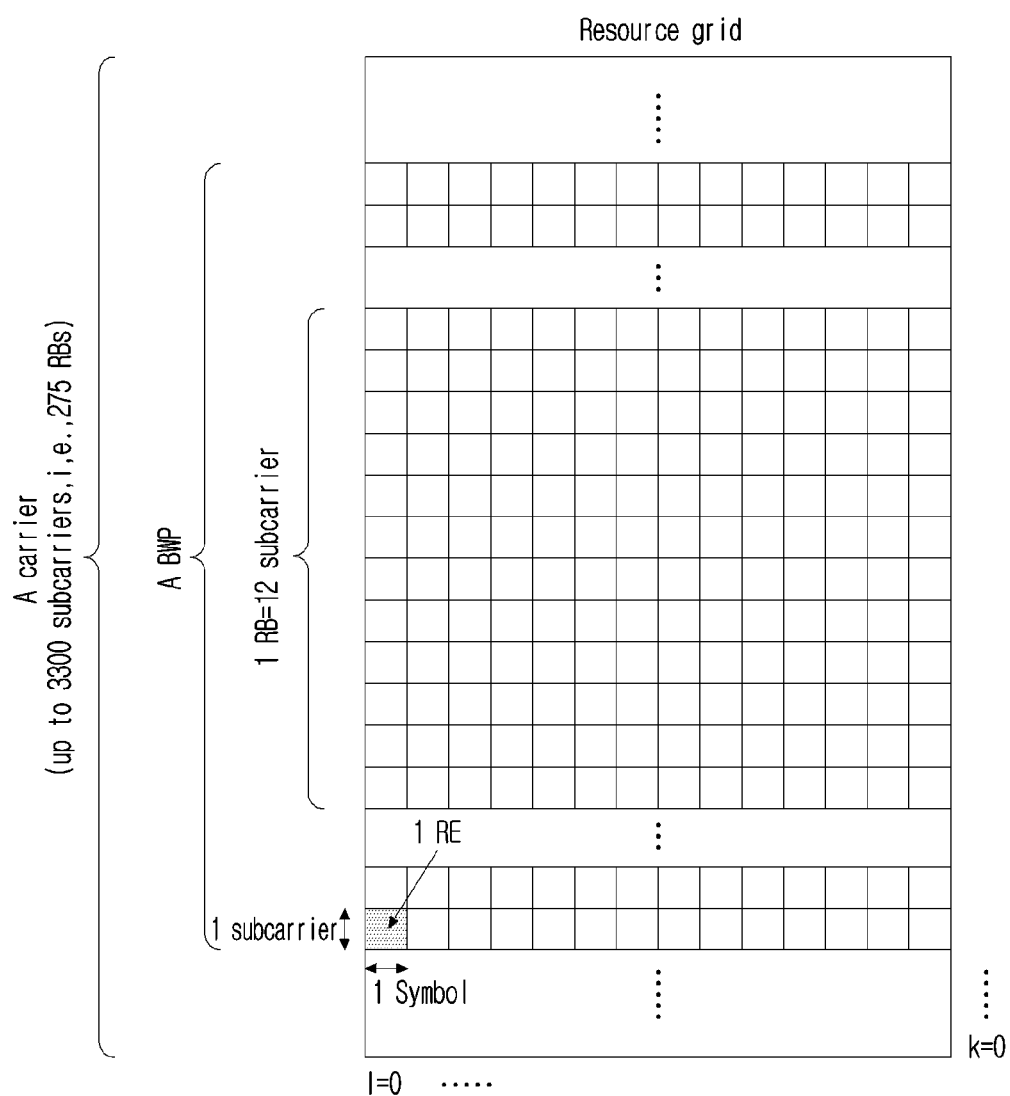
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC.

Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
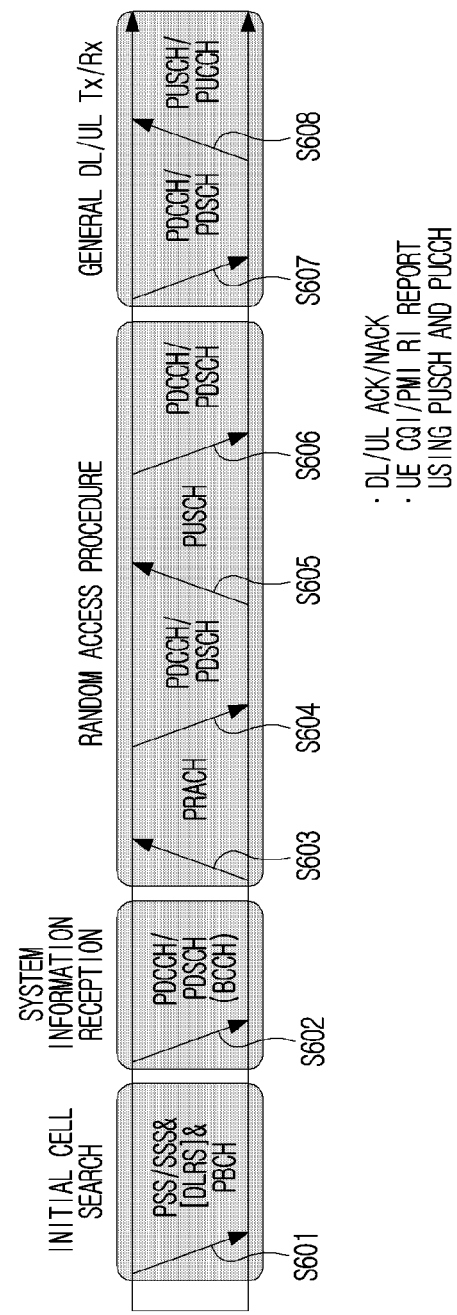
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid—Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each)DCI format may be pre-defined. DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block) —PRB(physical resource block) mapping, etc.), information related to a transport block(TB) (e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Multi Panel Operations

'A panel' referred to in the present disclosure may be interpreted/applied as 'a plurality of (or at least one) panels' or 'a panel group' (having a similarity/a common value from a viewpoint of a specific characteristic (e.g., timing advance (TA), a power control parameter, etc.)). Alternatively, 'a panel' referred to in the present disclosure may be interpreted/applied as 'a plurality of (or at least one) antenna ports' or a plurality of (or at least one) uplink resources' or 'an antenna port group' or 'an uplink resource group (or set)' (having a similarity/a common value from a viewpoint of a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having a similarity/a common value from a viewpoint of a specific characteristic (e.g., TA, a power control parameter, etc.)). Alternatively, 'a panel' referred to in the present disclosure may be defined as a unit for a terminal to configure a transmission/reception beam. For example, 'a transmission pane1' may generate a plurality of candidate transmission beams in one panel, but it may be defined as a unit which may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set)' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be changed according to terminal implementation. In addition, 'a panel' referred to in the present disclosure may be interpreted/applied as 'a plurality of panels' or 'a panel group' (having a similarity from a viewpoint of a specific characteristic).

Hereinafter, multi-panel structures will be described.

Terminal modeling which installs a plurality of panels (e.g., configured with one or a plurality of antennas) in terminal implementation in a high-frequency band (e.g., bi-directional two panels in 3GPP UE antenna modeling). A variety of forms may be considered in implementing a plurality of panels of such a terminal. Contents described below are described based on a terminal which supports a plurality of panels, but they may be extended and applied to a base station (e.g., a TRP) which supports a plurality of panels. The after-described contents related to multi-panel structures may be applied to transmission and reception of a signal and/or a channel considering multi panels described in the present disclosure.

Figure 7:
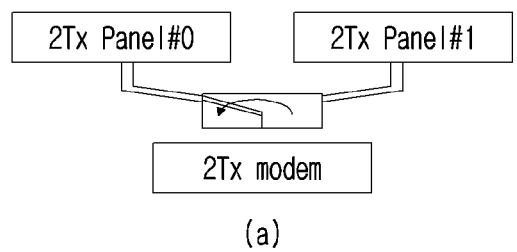
FIG. 7 illustrates a method of transmitting multiple TRPs in a wireless communication system to which the present disclosure may be applied.
Figure 7:
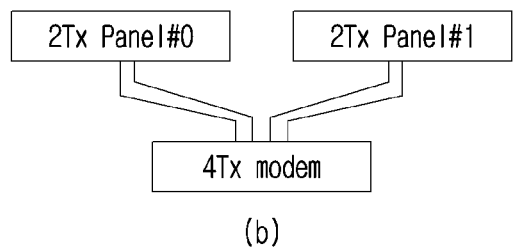

FIG. 7 is a diagram illustrating multi panel terminals in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on a RF switch as in FIG. 7 (a). In this case, only one panel is activated for a moment and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a model and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent; or periodic)) may be referred to as an SRS resource group. For this SRS resource group, an SRS resource set configuration supported in a Rel-15 NR system may be utilized as it is or it may be ,configured separately by bundling one or, a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS-resources belonging to a different SRS resource set. Accordingly, if panel implementation and simultaneous transmission of a plurality of panels as in FIG. 7(b) are considered, a corresponding concept (an SRS resource set) itself may be matched to an SRS resource group. But, an SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to a UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for a UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied.

Here, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which may be transmitted per panel. In other words, the UE may respectively correspond 2 UL beams to 2 configured SRS resources per each panel and transmit them when 4 panels are implemented. In this situation, according to Rel-15 standards, one of a codebook(CB)-based UL or non-codebook(NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

i) MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3 gpp agreement, a technical report(TR) document and/or a technical specification(TS) document, etc.).

ii) MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3 gpp agreement, a TR document and/or a TS document, etc.).

iii) MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3 gpp agreement, a TR document and/or a TS document, etc.).

Regarding multi panel-based signal and/or channel transmission and reception suggested in the present disclosure, at least one of the above-described 3 MPUE categories may be supported. In an, example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically caccording to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier(ID), an indicator, etc.) for configuring and/or indicating a panel which will be used for transmission and reception among one or more panels may be considered.

In an example, an ID for a panel may be used for panel-selective transmission of a PUSCH, a PUCCH, an SRS, and/or a PRACH among activated multiple panels. The ID may be configured/defined based on at least any one of the following 4 methods (options (Alts) 1, 2, 3, 4).

i) Alt.1: An ID for a panel may be an SRS resource set ID.

In an example, it may be desirable to correspond each UE Tx panel to an SRS resource set configured in terms of terminal implementation when considering a) an aspect that SRS resources of multiple SRS resource sets having the same time domain behavior are simultaneously transmitted in the same BWP, b) an aspect that a power control parameter is configured in a unit of an SRS resource set, c) an aspect that a terminal may report up to 4 SRS resource sets (they may correspond to up to 4 panels) according to a supported time domain behavior. In addition, an Alt.1 scheme has an advantage that an SRS resource set related to each panel may be used for 'codebook' and 'non-codebook'-based PUSCH transmission. In addition, for an Alt.1 scheme, multiple SRS resources belonging to multiple SRS resource sets may be selected by extending an SRI (SRS resource indicator) field of DCI. In addition, a mapping table of an SRI to SRS resource may need to be extended to include SRS resources in the whole SRS resource set.

ii) Alt.2: An ID for a panel may be an ID which is (directly) associated with a reference RS resource and/or a reference RS resource set.

ii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., an SRS, a CSI-RS and/or an SSB). A current SRI field may be reused to select a UL TCI state from a configured set or a new DCI field of DCI format 01 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1: Layer1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to a panel may be configured in a unit of a single panel or in a unit of multiple panels (e.g., a panel group, a panel set).

Sounding Reference Signal (SRS) Sounding Reference Signal)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator) (P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, an SRS for a codebook(CB) and a non-codebook(NCB) is described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on transmission of a corresponding SRS and use it for PUSCH scheduling of a terminal. Subsequently, a base station may indicate a PUSCH (transmission) beam of a terminal by indicating an SRS resource for 'a CB' which is previously transmitted by a terminal through an SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management is described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, a UE may be configured with K≥1 SRS resources (a higher layer parameter, 'SRS—' resources). Here, K is a natural number, and the maximum value of K is indicated by SRS-capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from a UE after scheduling transmission of an SRS to a UE (User Equipment) under a situation of a single cell or multi cells (e.g., carrier aggregation (CA)) based on TDD. In this case, a base station may perform scheduling of a DL signal/channel to a UE based on measurement by an SRS by assuming DL/UL reciprocity. Here, regarding SRS-based DL CSI acquisition, an SRS may be configured for antenna switching.

In an example, when following standards (e.g., 3 gpp TS38.214), usage of an SRS may be configured to a base station and/or a terminal by using a higher layer parameter (e.g., usage of a RRC parameter, SRS-ResourceSet). Here, usage of an SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL(downlink) CSI(Channel State Information) acquisition through SRS transmission under a situation such as TDD (Time Division Duplex). When antenna switching is applied, about 15 μs may be generally needed between SRS resources (and/or resources between an SRS resource and a PUSCH/PUCCH) for antenna switching of a terminal. By considering it, (the minimum) guard period as in the following Table 7 may be defined.

TABLE 7

| μ | $\Delta f = 2^\mu \cdot 15$ [kHZ] | Y [Symbol] |
|---|---|---|
| 0 | 15 | 1 |
| 1 | 30 | 1 |
| 2 | 60 | 1 |
| 3 | 120 | 2 |

In Table 7, μ represents numerology, Δf represents subcarrier spacing and Y represents the number of symbols of a guard period, i.e., a length of a guard period. In reference to Table 7, the guard period may be configured based on a parameter μ which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter, SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter, SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, an SRS port for each SRS resource in 2 given SRS resource sets may be configured to be associated with a different UE antenna port.

(Example S4) In another example, for a terminal which supports 1T1R, 2T2R, or 0.4T4R, up to 2 SRS resource sets respectively configured with one SRS resource sets may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set (s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

Method of Transmitting and Receiving Sounding Reference Signal (SRS)

In Rel-15 NR MIMO, it is agreed to be supported SRS transmission for antenna switching for efficiently acquiring DL CSI for a UE in which the number of transmission antennas (Tx antennas) is less than the number of reception antennas (Rx antennas). A UE supporting antenna switching may report one of {"1T2R", "1T4R", "2T4R", "1T4R/2T4R", "T=R"}to a base station as capability information. Here, 'mTnR' may mean a terminal capability that supports m transmissions and n receptions. A base station may configure an SRS resource set and/or resource for antenna switching corresponding to a capability of a UE, and indicate a UE to transmit an SRS. In addition, a base station should consider an antenna switching time of a UE, when configuring a time domain location of a resource in an SRS resource set for antenna switching, and should configure to have (to secure) a symbol gap (as a guard period) according to numerology between resources (See Table 7 and its description above).

In Rel-16 NR eMIMO, a discussion on enhancement for panel-specific UL transmission is ongoing. When a concept of 'panel' is introduced in an antenna switching procedure, it is necessary to additionally consider multi-panel simultaneous transmission, a beam indication for each panel, and a panel switching time, etc. In the present disclosure, a method for configuring/indicating antenna switching of a base station for a clear antenna switching operation of a multi-panel UE in this situation and a UE operation subsequent thereto will be described.

Agreement on Multi-Beam Enhancement

In Rel-16, an identifier (ID: identifier) that can be used to indicate at least panel-specific UL transmission is supported.

For UL beam management latency reduction in controlling PUCCH spatial relation, the maximum RRC configurable number of spatial relations for PUCCH (i.e., maxNrofSpatialRelationInfos) is increased to be 64 per BWP.

At least an identifier (ID) for indicating panel-specific UL transmission is merged or down-selected from the following alternatives.

Alternative 1: an SRS resource set ID
Alternative 2: an ID, which is directly associated to a reference RS resource and/or resource set
Alternative 3: an ID, which can be assigned for a target RS resource or resource set
Alternative 4: an ID which is additionally configured in spatial relation info Following multi-panel UE (MPUE) categories can be used for discussions on possible enhancements.

MPUE-Assumption1: Multiple panels are implemented on a UE and only one panel can be activated at a time, with panel switching/activation delay of [X]ms. Here, MPUE-Assumption2: Multiple panels are implemented on a UE and multiple panels can be activated at a time and one or more panels can be used for transmission.

MPUE-Assumption3: Multiple panels are implemented on a UE and multiple panels can be activated at a time but only one panel can be used for transmission.

Hereinafter, in the present disclosure, a method of configuring/indicating antenna switching of a base station for a multi-panel UE and a method of operating a terminal/base station according to the method are proposed.

For example, as in the above classification, a multi-panel UE may be classified into the following three types.

A UE that cannot activate multiple panels at the same time and can only activate one panel at one timing (may correspond to the MPUE-Assume 1)

A UE capable of simultaneously activating multiple panels and using one or multiple panels even during transmission (which may correspond to the MPUE-Assume 2)

A UE that can activate multiple panels at the same time, but can used only one panel during transmission (which can correspond to the MPUE-Assume 3)

The proposals to be described below may be proposals corresponding to only one type of a UE among three types of a UE, or conversely, proposals corresponding to two types of UEs or all three types of UEs.

Embodiment 1: A UE capability for a panel switching operation and an SRS resource setting for panel switching If the number of Tx panels and Rx panels that a UE can utilize exists (with a UE capability), and if the number of Tx panels is less than or equal to the number of Rx panels, in order to obtain DL CSI information for each panel, it is necessary to introduce a concept of 'panel switching' in which an SRS is transmitted for each panel.

There may be also a UE capability for this panel switching such as "1Tp2Rp" (i.e., 1 Tx panel and 2 Rx panel), "2Tp4Rp" (i.e., 2 Tx panel and 4 Rx panel), "1Tp4Rp" (i.e., 1 Tx panel and 4 Rx panel), etc., and a UE may report corresponding capability to a base station.

In addition, SRS resource set(s) for antenna switching may be configured for each panel. In this case, there may be a capability of a terminal as to whether a terminal can simultaneously transmit the corresponding SRS resource sets configured for each panel. Specifically, there may be a capability of a terminal as to whether a base station can configure individual SRS resource sets configured for each panel in the same slot or/and whether a UE can transmit it. And/or there may be a capability of a terminal as to whether a base station can configure SRS resources included in an individual SRS resource set configured for each panel in the same symbol and/or whether a UE can transmit it.

Specifically, if a capability of a UE is "1Tp2Rp", the existing Rel-15 NR antenna switching (e.g., "1T2R") may be indicated for each Rx panel. In this case, a UE may have an SRS resource set for antenna switching related to each Rx panel. That is, in this case, a UE may be configured with an SRS resource set for antenna switching for each Rx panel. Here, since a concept of "1Tp2Rp" can be regarded as a higher-level concept than "1T2R", a larger conceptual set (i.e., SRS resource setting for panel switching) that binds multiple SRS resource sets from each panel may need to be newly defined.

In addition, in a case of a multi-panel UE, a capability for antenna switching may be reported to a base station for each panel (per-panel) the same or differently. For example, it is assumed that a panel switching capability of a 2-panel UE is "1Tp2Rp", and for each panel, "1T2R" is supported for a first panel and "1T4R" is supported for a second panel. In this case, in a capability of an SRS resource setting for panel switching, a UE may be configured to report an integrated capability considering a hierarchy of panel switching and antenna switching such as {"1Tp2Rp" with "172R" for panel 0 and "1T4R" for panel 1}to a base station. Through this, a base station may configure/indicate to a UE an SRS for panel switching and antenna switching corresponding to the cdrresponding capability.

Additionally, whether SRS simultaneous transmission from an SRS resource set related to each panel described above in Embodiment 1 can be transmitted or a time required to switch a panel may also be included in the integrated capability and transmitted. For example, a UE may report to a base station as {"1Tp2Rp" with "1T2R" for panel 0 and "1T4R" for panel 1, whether an SRS resource set of each panel can be transmitted simultaneously (i.e., 0 (yes) or X (no)), time required for panel switching}.

Here, for which SRS resource set is related to which panel, it may be configured/indicated for which panel the corresponding SRS resource set corresponds to in a higher layer configuration (e.g., in an SRS resource set configuration (SRS-ResourceSet) in an information element (IE) for an SRS configuration (i.e., SRS-config)) for configuring an SRS resource set from a base station. After a UE reports the number of Tx panels and Rx panels, when the UE reports DL CSI after receiving a CSI-RS, the UE may transmit a report including a panel index to a base station. Accordingly, a base station may recognize a situation for each panel, and based on this recognition, the panel configuration/indication may be generated by reflecting it in an SRS resource setting. A UE may report an integrated capability for an SRS resource setting for panel switching to a base station according to a configuration/indication between a corresponding SRS resource set and a UE panel, and a UE operation is possible according to a subsequent configuration/indication of a base station for panel switching.

The following methods may be considered as an embodiment of the integrated capability report.

Method 1-1) In a case of a UE that can use one or more panels for transmission such as MPUE-Assumption 2, a UE may be configured to (optionally) report information on a panel switching delay and to report that the UE can transmit simultaneously, such as {"1Tp2Rp" with "1T2R" for panel 0 and "1T4R" for panel 1, whether an SRS resource set of each panel can be transmitted simultaneously: 0 (Yes), time required for panel switching: 0 ms (optional reporting)}.

Method 1-2) In a case of a UE that can use only one panel for transmission such as MPUE-Assumption 1, MPUE-Assumption 3, a UE may be configured to (mandatorily) report a panel switching delay and to report that the UE cannot transmit simultaneously, such as {"1Tp2Rp" with "1T2R" for panel 0 and "1T4R" for panel 1, whether an SRS resource set of each panel can be transmitted simultaneously: X (No), time required for panel switching: 2 ms (mandatory reporting)}.

Reporting of a panel switching delay may be mandatory or optional depending on whether simultaneous transmission of an SRS resource set from each panel is possible, this is because, if simultaneous transmission is possible, there is no need to consider a panel switching delay, and only a time required to turn on a panel is considered.

Method 1-3) In a case of a report of the above integrated capability, it is also possible to report as an individual capability for each item.

Embodiment 2: An SRS configuration for a UE capable of multi-panel simultaneous transmission and a method for reducing interference between simultaneous transmission SRS beams from multi-panel In a multi-panel UE (MPUE-Assumption 2) that can simultaneously activate multiple panels and use one or multiple panels for transmission, if an SRS resource for antenna switching is connected to different panels of a UE, a base station may configure/indicate to transmit SRSs from the different panels simultaneously (in the same symbol) through each SRS resource from the different panels.

Specifically, in a certain UE, an SRS resource set for antenna switching for each panel may be configured separately, and a base station may configure corresponding different SRS resource sets in the same slot. In addition, a base station may configure each SRS resource from each of different SRS resource sets to the same symbol in a certain UE. In this case, a UE may transmit each SRS in the same symbol through each SRS resource from each of different SRS resource sets that is pre-configured. Conversely, in a case of a UE such as MPUE-Assumption 1 and MPUE-Assumption 3, where only one panel can be used during transmission, since it is impossible to simultaneously transmit each SRS through SRS resources from different panels, the above operation is impossible. In this case, it is necessary to consider a panel switching delay between SRS transmissions from different panels.

And/or, a base station may configure only one time domain symbol level position of an SRS resource to a UE so that the UE can minimize inter-beam interference between SRS resources simultaneously transmitted (in multiple panels). Alternatively, it may be configured with a set (time domain symbol level position candidate set) including a plurality of symbol level positions. In addition, when a base station configures/triggers SRS resources for simultaneous transmission, the base station may configure/indicate/update a location of each SRS resource within the set by MAC CE/DCI, etc. so that an SRS resource combination minimizes interference of SRS beams from two panels.

For a UE such as MPUE-Assumption 2 capable of simultaneously transmitting SRSs from different panels through each SRS resource from different panels, in order for a base station to estimate a channel from signals transmitted by a UE through SRSs of different SRS resources in the same symbol, improved channel estimation performance can be obtained when SRS transmission is performed through an orthogonal beam between each SRS resource. Therefore, in order to obtain such improved performance, it is necessary to reduce interference between beams of SRSs simultaneously transmitted from different panels through SRS resources from each panel.

For example, if a candidate position of a symbol level position of an SRS resource is 0 to 5 when indexed from the last symbol of a subframe (currently, in Rel-15 NR, by RRC, a starting position is configured from 0 to 5 and the number of consecutive symbols (1, 2, 4) is configured), it may operate as follows (according to a value of a consecutive symbol duration).

Example 1) When a consecutive symbol duration is 1: A base station may configure a symbol level position candidate set (e.g., SRS resource 1 (from panel 1)={3, 5}, SRS resource 2 (from panel 1)={3, 5}, SRS resource 3 (from panel 2)={3, 5}, SRS resource 4 (from panel 2)={3, 5}) to a UE through an RRC configuration. In addition, which combination of them (e.g., SRS resource 1 (from panel 1)={3}, SRS resource 2 (from panel 1)={5}, SRS resource 3 (from panel 2)={5}, SRS resource 4 (from panel 2)={3}, where SRS resources 1 and 4 are transmitted simultaneously, SRS resources 2 and 3 are transmitted simultaneously) is used for simultaneous transmission may be configured/indicated/updated by a MAC CE or DCI (n bits). In a symbol level position of an SRS resource, simultaneous transmission may be possible by reducing interference between beams of SRS resources to be transmitted (simultaneously) from each panel of a UE through more dynamic configuration/indication of a base station.

This is because, when the number of panels of a UE simultaneously transmitting increases to more than two, in order to reduce interference between beams of each SRS resource transmitted from different panels, beam arrangement to reduce inter-beam interference by setting candidates for a symbol level position of each SRS resource can have the effect of reducing overhead in configuring between a base station and a terminal rather than updating all spatial relations. In addition, even in a case of multiplexing SRSs of multiple UEs in a limited time-frequency domain, there is an advantage that a base station can configure to reduce interference between SRS beams between concurrently scheduled UEs.

Example 2) When a consecutive symbol duration is two or more: a base station may configure/indicate to a UE a combination form for a symbol time duration (1, 2, 4) in addition to a symbol level start position candidate. For example, a base station may configure a UE (e.g., SRS resource 1 (from panel 1)={(starting=3, duration=2), (starting=5, duration=1)}, SRS resource 2 (from panel 1)={(starting=3), duration=2), (starting=5, duration=)}, SRS resource 3 (from panel 2)={(starting=3, duration=2), (starting=5, duration=1)}, SRS resource 4 (from panel, 2)={(starting=3,duration=2), (starting=5, duration=1)}) through an RRC configuration. In addition, a base station may configure/indicate with a MAC CE or DCI (n bits) for which ordered pair (by down-select) among them (for the individual SRS resource) to transmit.

This base station-terminal operation can be extended even when the number of panels of a UE is 3 or more (e.g., 4).

In addition, the disclosure of Embodiment 2 may be configured/indicated in an SRS resource setting (for panel switching) configured by a base station (described in Embodiment 1).

Embodiment 3: An SRS configuration of a base station and a UE operation in consideration of an SRS configuration and a panel switching delay for a UE incapable of multi-panel simultaneous transmission A UE (MPUE-Assumption 1) that cannot simultaneously activate multiple panels and can only activate one panel at one timing and a UE (MPUE-Assumption 3) that can simultaneously activate multiple panels but can use only one panel for transmission are considered. In this case, if SRS resource sets for antenna switching are associated with different panels of a UE, a base station sets/configures a 'guard period (or gap period) for panel switching' between each configured/indicated SRS resource set in consideration of a time required for a UE to switch a panel (e.g., panel switching delay), it is possible to ensure that there is no ambiguity in a UE operation.

This 'guard period for panel switching' may be configured/indicated in an SRS resource setting (for panel switching) configured by a base station (described in Embodiment 1). In addition, an SRS resource setting may be configured by combining SRS resource sets (for antenna switching) configured for each panel in consideration of the corresponding 'guard period for panel switching'. That is, for each panel, a hierarchical structure in which 'an SRS resource set for antenna switching' exists and 'an SRS resource setting for panel switching' that can group (combination) the sets (considering 'guard period for panel switching') exists may be configured (e.g., in Embodiment 1 {"1Tp2Rp" with "1T2R" for panel 0 and "1T4R" for panel 1), simultaneous transmission of an SRS resource set of each panel is possible: X (No), time required for panel switching: 2 ms (mandatory report)}).

Specifically, by configuring a slot level time domain gap for each UE capability, considering a panel switching delay between 'SRS resource sets for antenna switching' from each panel by using an SRS resource setting (for panel switching), a base station may configure a 'guard period for panel switching'. In addition, by configuring an SRS resource set for antenna switching from each panel over one or two slots in the same way as in the existing Rel-15, an SRS resource may be configured in consideration of a 'symbol gap for antenna switching' in the corresponding slot. In this way, a base station may configure/indicate to a UE a 'guard period for panel switching 'and a 'symbol gap for antenna switching' through a hierarchical structure.

Alternatively, as another configuration/indication method of a base station, UEs that cannot simultaneously transmit SRS resources, such as MPUE-Assumption 1 and MPUE-Assumption 3 is configured. If it is a UE with 2 panels, it is assumed that each panel is "1T2R". A UE may report a UE capability considering panel switching as "1T4R", and the UE can support panel switching by maintaining the existing antenna switching capability. Here, by separately reporting only a 'guard period for panel switching (e.g., 2 ms or number of slots)' as a capability of a UE, an operation between a base station and a UE may be defined so that there is no difficulty in an operation of a UE between panel switching.

A time required for switching each panel of a UE (e.g., panel switching delay) may exist as a UE capability (e.g., a guard period for panel switching). A UE reports this capability to a base station and may not expect SRS resource sets from each panel to be configured/indicated at a time interval smaller than the corresponding delay. In addition, a base station may also configure/indicate an SRS resource setting (for panel switching) to have/set (secure) a 'guard section for panel switching' between SRS resource sets from each panel in consideration of the reported delay. If an SRS transmission indication to another panel is received from a base station within a 'guard period for panel switching', which is a capability of a UE, the UE may either discard the corresponding SRS transmission indication or transmit the indicated SRS by maintaining a previously transmitted panel.

There may be SRS resource sets (for antenna switching) from two or more (e.g., four) panels in a panel switching SRS resource setting.

Embodiment 4. A UE operation when a panel receiving DCI triggering an SRS and a panel transmitting an SRS do not match A UE (MPUE-Assumption 1) that cannot simultaneously activate multiple panels and can only activate one panel at one timing and a UE (MPUE-Assumption 3) that can simultaneously activate multiple panels but can use only one panel for transmission are considered. When a panel switching guard period is defined as a UE capability, and when considering an Rx panel and a Tx panel, a case where an Rx panel that receives DL/UL DCI in which an SRS is triggered and a Tx panel of the indicated SRS are different can occur. In this case, if a time location of the triggered SRS from a DCI reception time is after a panel switching guard period, a terminal normally transmits the SRS after panel switching in response to the DCI indication. Conversely, if a time location of the triggered SRS from a DCI reception time is within a panel switching guard period, a UE may use a predetermined (predefined) default UL panel (e.g., a UL panel corresponding to the lowest CORESET or a pre-defined/preconfigured fallback UL panel) or may use a UL panel corresponding (or the same) to a DL panel (Rx panel) used when receiving DCI.

The operation of the above-described method is summarized as follows.

Step 1) A UE may report to a base station (BS) on panel-related capability information (e.g., the number of Tx/Rx panels, whether multiple panels can be transmitted simultaneously, a panel switching delay, etc.).

Here, the report may be performed as in Embodiment 1 described above. For example, in a case of a UE capable of simultaneous transmission for each panel, the report may be performed as in Embodiment 2 above. Alternatively, in a case of a UE incapable of simultaneous transmission per panel, the report may be performed as in Embodiment 3 above.

Step 2) A UE may receive SRS related configuration information from a BS.

Here, for example, the SRS-related configuration information may include an SRS-Config IE. An SRS may be transmitted periodically or semi-statically or aperiodic.

Step 3) a) When a UE receives an SRS trigger through a DL/UL grant (through a PDCCH) from a BS, or b) when an RRC/MAC CE configuration-based SRS transmission time arrives, the following may be operated.

For example, in a case of a UE capable of simultaneous transmission per panel, the UE may perform the operation according to Embodiment 2 above. Alternatively, in a case of a UE incapable of simultaneous transmission per panel, the UE may perform the operation according to Embodiment 3 above.

Here, if an SRS is triggered through DCI and a DCI reception panel and a panel for transmitting the SRS are different, a UE may perform the operation according to Embodiment 4 above.

Not all steps of each step described above are essential, and some steps may be omitted depending on circumstances.

In addition, the above-described operation of a UE/base station may be implemented using an apparatus to be described later.

Meanwhile, in Rel-15 NR MIMO, for a UE in which the number of transmission antennas (Tx antenna) (or Tx chain) is less than the number of reception antennas (Rx antenna) (or Rx chain), it has been agreed to support SRS transmission for antenna switching in order to efficiently acquire DL CSI. A UE supporting antenna switching may report one of {"1T2R", "1T4R", "2T4R", "1T4R/2T4R", "T=R"} to a base station as a capability. A base station may configure an SRS resource set and resource for antenna switching corresponding to the corresponding capability, and indicate a UE to transmit. In Rel-16 NR standardization, a new UE capability for the antenna switching was introduced. There is a possibility that antenna switching for a UE having more than four Rx antennas will be supported later. This is because, in the current NR standard, the maximum number of UL layers (or the maximum number of Tx chains) of a UE is 4, and the number of DL max layers supportable for one UE is 8, so for eMBB operation a UE may have a maximum of 8 Rx antennas (Rx chain). As described above, when the number of Tx chains of a UE is less than the number of Rx chains, an antenna switching operation enables efficient DL channel estimation-based reciprocity. However, since a time required for switching for a large number of antennas increases, a problem such as not being able to complete antenna switching within a single UL slot may occur. In addition, even if antenna switching is performed across a plurality of UL slots, if a plurality of UL slots are far apart in time, since channels between UL slots are greatly altered, it may be difficult to obtain accurate DL CSI. In addition, an explicit/implicit UL panel index (i.e., a panel identifier (P-ID)) of a UE may be utilized for UL channel/RS transmission. Here, when a concept of a panel is introduced even in an antenna switching procedure, it is necessary to additionally consider a panel switching time, etc.

In the present disclosure, based on this background, a method in which a base station configure/indicate antenna switching to a terminal having more than four Rx antennas will be described, and a subsequent antenna switching operation of a terminal will be described.

Hereinafter, in the present disclosure, "transmission of an SRS resource set" may have the same meaning as "transmitting an SRS based on information configured in an SRS resource set". In addition, "transmission of an SRS resource" or "transmission of SRS resources" may have the same meaning as "transmitting an SRS or SRSs based on information configured in an SRS resource". In addition, "performing SRS antenna switching" may have the same meaning as "transmitting an SRS resource set or an SRS resource for antenna switching". In addition, an enhanced SRS after Rel-17 may be referred to as an additional SRS or an enhanced SRS. In addition, a terminal supporting the additional (enhanced) SRS may be referred to as an additional terminal (additional UE) or an enhanced terminal (enhanced UE). In this regard, a legacy SRS refers to an SRS in which up to 4 symbols can be configured (legacy SRS configuration), and an enhanced SRS (additional SRS) refers to an SRS in which more than 4 symbols can be configured (enhanced SR'S (additional SRS) configuration). This is only for convenience of description and is not intended to limit the technical scope of the present disclosure. For example, an SRS in which up to 4 symbols can be configured may be referred to as a first SRS, and an SRS in which more symbols than 4 symbols can be configured may be referred to as a second SRS. Accordingly, a legacy SRS configuration may be referred to as a first SRS configuration, and an enhanced SRS (additional SRS) configuration may be referred to as a second SRS configuration. Also, in this disclosure, '/' means 'and' or 'or' or 'and/or' depending on the context.

Hereinafter, a method in which a base station configures/indicates an SRS for antenna switching to a terminal having more than four Rx antennas (or Rx chain) and a subsequent method for transmitting an SRS for antenna switching of a terminal will be described.

Embodiment 5: Before a base station configures an SRS resource set and/or an SRS resource for antenna switching for a terminal having the number of Rx antennas greater than 4 Rx, a terminal capability reporting method is proposed as follows.

Here, a terminal may report terminal capability information (i.e., UE Capability information element (IE) to a base station through higher layer signaling (e.g., RRC message 'UECapabilityInformation'). Specifically, in relation to the present disclosure, a terminal may transmit terminal capability information (e.g., supportedSRS-TxPortSwitch) related to antenna switching to a base station as follows.

A terminal may report the following UE capability information to a base station before receiving a configuration for an SRS resource set or/and an SRS resource for antenna switching from a base station. A terminal may report to a base station as UE capability on i) (according to the number of Tx antennas (or Tx chain) of a terminal and the number of Rx antennas (or Rx chain)) the number of Tx antennas that can be transmitted simultaneously, and ii) the number of Rx antennas (or Rx chains), and iii) the number of Rx antennas that can (or will perform) sounding for DL CSI acquisition based on reciprocity. For example, if a terminal reports as "2T6R" as UE capability information to a base station, it can be interpreted that the terminal is capable of simultaneous transmission with respect to two Tx antennas (because it has two Tx chain) and that sounding can be performed with respect to six Rx antennas. As another example, if a terminal report to a base station as "4T8R" as UE capability information, it can be interpreted that the terminal is capable of simultaneous transmission for four Tx antennas and sounding is possible for eight Rx antennas.

Here, in a UE capability report such as "xTyR", y may not be accurately divided by x (i.e., if y is divided by x, a remainder occurs. e.g., 4T6R). This means that there may be overlapping Rx(Tx) antenna port(s) for each occasion (for each transmission of each SRS resource set or for each transmission of each SRS resource) in each SRS transmission occasion for antenna switching. For example, when 4T6R antenna switching is configured for two SRS resource sets, there may be overlapping SRS antenna ports between SRS resource set 1 and SRS resource set 2. Alternatively, when 4T6R antenna switching is configured for two SRS resource sets, SRS resource set 1 and SRS resource set 2 may be configured with different antenna ports, respectively. In this case, there may be overlapping SRS antenna ports between different SRS resources in SRS resource set 1, and/or overlapping SRS antenna ports between different SRS resources in SRS resource set 2 may exist. In the above case, the corresponding operation may be configured/switched/update/indicated by a base station.

A base station may configure an SRS resource set/SRS resource for antenna switching with a subset of a terminal capability, based on a capability report of a terminal. For example, when a terminal reports as 4T6R as a capability report, a base station may configure the SRS resource set/SRS resource corresponding to 4T6R, but the base station may configure to the terminal the SRS resource set/SRS resource such as 2T6R, which is a subset of the configuration. In addition, a base station may configure/indicate for a terminal to transmit an SRS based on the corresponding configuration. Due to this operation, a base station does not configure the maximum possible capability of a terminal, and by configuring it as a subset of the maximum capability of a terminal, it can have an effect of saving power in an operation of a terminal or preventing an operation of a terminal from being excessive.

In addition, when a terminal reports a capability for antenna switching, the terminal may report to a base station whether the corresponding "xTyR" report is i) a possible configuration in one panel or ii) a possible configuration across multiple panels. That is, a terminal may report how many panels are associated with an antenna switching operation of an SRS.

In addition, the "xTyR" report may be individually/separately performed for each panel of a terminal. In this case, a terminal may also report whether or not an SRS antenna switching operation for multiple panels can be completed within a single UL slot depending on whether a panel switching delay exists.

In this way, a base station receiving a separate report for each panel can recognize an antenna switching capability for each panel. Therefore, a base station can i) perform an SRS resource set/SRS resource configuration for an integrated "xTyR" of an entire panel, or ii) perform a separate SRS resource set/SRS resource configuration for "xTyR" for each panel.

Embodiment 6: Based on a terminal capability report of Embodiment 5 for antenna switching, a method in which a base station configures an SRS resource set and/or SRS resource for antenna switching for a terminal having an Rx antenna number greater than 4 Rx is proposed as follows.

Here, when s terminal reports capability as in Embodiment 5, depending on whether the corresponding "xTyR" report is i) a report/configuration for one panel (or a single-panel terminal) or ii) a report/configuration for multiple panels (or a multi-panel terminal), a base station may perform the following SRS configuration.

i) In case of a report/configuration for one panel (or in case of a single-panel terminal)

For antenna switching configuration for a single-panel terminal, a base station may configure/indicate to perform SRS antenna switching with a subset of "xTyR" reported by a terminal by configuring one or multiple SRS resource sets for antenna switching.

i-1) When a base station configures one SRS resource set based on "xTyR" (i.e., in terminal capability information) reported by a terminal When the number of symbols of SRS resources in an SRS resource set for antenna switching including a gap symbol (i.e., a gap symbol between SRS resources) does not exceed the number of available SRS symbols in a slot (i.e., a slot that is a target of an SRS configuration) in which transmission is to be configured/indicated, a base station may configure one SRS resource set to a terminal.

For example, it is assumed that a terminal has reported an antenna switching-related capability as "2T8R", and a base station performs a configuration for an SRS resource set/SRS resource based on the report. In this case, when configuring four 2-port SRS resources having 1 symbol in one SRS resource set (i.e., when 4 SRS resources are configured in one SRS resource set, and each SRS resource is configured to be transmitted in one symbol with two SRS ports), 4 SRS symbols and 3 gap symbols may be required for a terminal to complete antenna switching based on the corresponding configuration (gap symbol may vary depending on subcarrier spacing). Accordingly, a base station may configure/indicate a terminal to transmit the corresponding SRS resource set in a slot where SRS symbol resources of 7 symbols or more (4 SRS symbols+3 gap symbols) are available. In other words, when resources for transmitting the SRS resource set for the antenna switching is insufficient (i.e., when a cell-specific SRS symbol resource and/or a UE-specific SRS symbol resource are insufficient (in a specific slot or in all UL slots)), a base station cannot configure/indicate the transmission of the corresponding SRS resource set, and it is necessary to update the configuration for the corresponding SRS resource set. For example, in case of a legacy SRS, it is possible to configure/indicate SRS transmission in the last 6 symbols in a slot, but in case of an additional (enhanced) SRS, there is a possibility that all 14 symbols in a slot can be utilized. Accordingly, a cell-specific SRS resource and/or a UE-specific SRS resource may be a subset of the corresponding 14 symbols.

i-2) When a base station configures a plurality of SRS resource sets based on "xTyR" (i.e., in terminal capability information) reported by a terminal When the number of symbols of SRS resources in an SRS resource set for antenna switching including a gap symbol (i.e., a gap symbol between SRS resources) exceeds the number of available SRS' symbols in a slot (i.e., a slot that is a target of an SRS configuration) in which transmission is to be configured/indicated, a base station may configure a plurality of SRS resource sets to a terminal. In this case, each SRS resource set may be configured in different slots.

For example, it is assumed that a terminal has reported an antenna switching-related capability as "1T6R", and a base station performs a configuration for an SRS resource set/SRS resource based on the report. In this case, when configuring 6 SRS resources of 1-port having 1 symbol in one SRS resource set (i.e., when 6 SRS resources are configured in one SRS resource set, and each SRS resource is configured to be transmitted in one symbol with one SRS port), 6 SRS symbols and gap symbols may be required for a terminal to complete antenna switching based on the corresponding configuration(gap symbol may vary depending on subcarrier spacing). Here, if there is a slot in which 11 SRS symbol resources are available, a base station may configure/indicate to a terminal SRS transmission after an SRS configuration in the corresponding slot. However, if there are no slots in which 11 SRS symbol resources are available, a base station may configure a plurality of (e.g., two or three) SRS resource sets in a plurality of slots and then configure/indicate SRS transmission to a terminal. That is, when resources for performing single SRS resource set configuration/transmission are insufficient (i.e., when a cell-specific SRS symbol resource or/and a UE-specific SRS symbol resource is insufficient (in a specific slot or in all UL slots)), a base station may configure/indicate a plurality of (e.g., two or three) SRS resource sets to a terminal. In the above example, two SRS resource sets may be configured. In addition, three 1-port SRS resources having 1 symbol may be configured in one SRS resource set (three SRS resources in one SRS resource set are configured, and each SRS resource is configured to be transmitted in one symbol with one first SRS port), and three 1-port SRS resources having 1 symbol with ports different from the ports of the resources may be configured in the other SRS resource set (three SRS resources are configured in one SRS resource set, and each SRS resource is configured to be transmitted in one symbol with one second SRS port). This is only an example, and a base station may configure the number of SRS resources equally for each SRS resource set. Alternatively, a base station may configure the number of SRS resources unevenly for each SRS resource set. For example, two SRS resources in one SRS resource set may be configured, and four SRS resources in another SRS resource set may be configured.

Specifically, in order to prevent transmission from being configured/indicated in the same UL slot, a plurality of SRS resource sets configured as described above may be configured to have different period values and offset values (i.e., periodicityAndOffset) (in case of a periodic/semi-persistent SRS resource set) or may be configured to have different slot, offsets (i.e., slotOffset) (in case of an aperiodic SRS resource set).

More specifically, ① time difference (e.g., n slots (n is a natural number)) in time domain between different UL slots in which a plurality of SRS resource sets are transmitted due to the different periodicityAndOffset/slotoffset may be limited. That is, transmission of a plurality of SRS resource sets in n slots may be limited to be completed. Here, an interval (e.g., n slots) in a time domain may be predetermined/predefined or may be configured by a base station. Due to time domain corruption of radio channels, it may be difficult to obtain accurate DL CSI for all Rx antenna ports due to channel corruption between SRS resource sets for antenna switching, and therefore a limitation may be configured/defined on a time distance between SRS resource sets with the above restrictions.

Alternatively, ② in a UE capability report/configuration, such as "xTyR" of Embodiment 5 (y is not accurately divided by x), for each SRS transmission occasion for antenna switching, a base station may configure "xTyR" (e.g., 4T8R, 2T8R, 4T6R, 2T6R, 3T4R, 2T4R, etc.) antenna switching to a terminal so as to have an overlapping Rx(Tx) antenna port for each occasion.

Here, the number of overlapping SRS antenna ports and a port index for each of a plurality of SRS resource sets/SRS resources may be configured/indicated by a base station. In other words, overlapping antenna port information (the number of antenna ports and a port index) at different SRS transmission occasions for each of the plurality of SRS resource sets may be configured by a base station. For example, overlapping antenna port information (the number of antenna ports and a port index) may be configured for SRS occasions for SRS resource set 1 and for SRS resource set 2. Alternatively, overlapping antenna port information (the number of antenna ports and a port index) may be configured by a base station at different SRS transmission occasions for the one or more SRS resources. For example, when two SRS resource sets are configured, overlapping antenna port information (the number of antenna ports and a port index) for SRS resource 1 and SRS resource 2 in SRS resource set 1 and/or overlapping antenna port information (the number of antenna ports and a port index) for SRS resource 3 and SRS resource 4 in SRS resource set 2 may be configured.

Here, overlapping SRS antenna port for each of a plurality of SRS resource sets/SRS resources may be a default port or a main port of a terminal, for example, may be a port with the best transmission/reception performance.

For example, when 2 ports in a configuration of "4T6R" are configured as overlapping ports, 2 port indexes of 6 Rx (Tx) antennas (i.e., port index 0 and 2) may be previously configured/indicated as overlapping ports between different SRS resources (and/or SRS resource sets). If 2 SRS resources are configured in the SRS resource set of the "4T6R" configuration, (by an overlapping port configuration configured by a base station) a terminal may perform sounding of port indexes 0, 1, 2, and 3 in one SRS resource and may perform sounding of port indexes 0, 2, 4, and 5 in another SRS resource. Alternatively, a base station may directly configure (e.g., by RRC signaling)/update (e.g., by MAC-CE)/indicate (e.g., by DCI) Rx (Tx) antenna port(s) for which a terminal should perform sounding for each SRS resource. If there is an overlapping SRS port in this overlapping SRS transmission occasion, even if a time distance between transmitted SRS resources (and/or SRS resource sets) is long and time corruption of radio channels occurs, there is an advantage that a base station can obtain a channel for an entire Rx antenna port in which a shifted phase due to a time of a channel coefficient is compensated through overlapping ports.

In addition, ③ a base station may perform grouping for Rx (Tx) antenna ports for sounding for each SRS resource (and/or SRS resource set), and such grouping may be configured to a terminal to be rotated. For example, in the "2T4R" antenna switching operation, a port index for sounding for each SRS transmission occasion (per transmission of each SRS resource set or per transmission of each SRS resource) may be configured in a rotational form, such as {(0,2), (1,3), (0,1), (2,3)}. Antenna port group rotation information may be preconfigured by a base station. For example, antenna port group information (e.g., {(0,2), (1,3), (0,1), (2,3)}) is configured to a terminal, and a terminal may transmit an SRS while sequentially (e.g., ascending or descending) circulating (e.g., repeating from the beginning when performing SRS transmission across all antenna groups) the configured antenna port group.

In this way, the same effect as method ② can be achieved through group rotation. The configuration of the ①, ② and ③ methods may be preconfigured before SRS transmission, and it may be configured/indicated when a base station configures(e.g., by RRC signaling)/activate(e.g., by MAC CE)/indicates(e.g., by DCI) SRS transmission to a terminal.

Alternatively, as described in method (1, when a base station intends to perform a configuration beyond the time restriction (time distance difference, for example, n slots), methods ② and/or ③ may be configured to a terminal.

Specifically, in an usage of an SRS resource set, the methods ② and/or ③ may be limited to be used in a configuration of an SRS resource set having a purpose (i.e., 'usage') for DL/UL partial reciprocity utilization (i.e., information related to angle(s) and delay(s) is estimated at a base station based on an SRS by utilizing DL/UL reciprocity of an angle and a delay, and the remaining DL CSI is reported by a UE) in the FDD system. This is effective in that more accurate reciprocity-based DL CSI information can be obtained through the methods ② and/or ③.

In the above-described i-1 and i-2, a terminal may expect that spatial relation information configurations (i.e., spatial-RelationInfo) (or UL-TCI state) of all SRS resources in one or a plurality of SRS resource set configurations are the same. Alternatively, a base station may configure to a terminal that spatial relation information configurations (i.e., spatialRelationInfo) (or UL-TCI state) of all SRS resources in one or a plurality of SRS resource set configurations are the same. This may mean that one or more SRS resource set configurations are for one panel. In addition, there is an effect that DL CSI acquisition under the same condition can be achieved by completing sounding for each antenna in one panel with the same Tx beam.

ii) In a case of reporting/configuration for multiple panels (or in a case of a multi-panel terminal)

For an antenna switching configuration for multi-panels of a terminal, a base station may configure/indicate to a terminal to perform SRS antenna switching with a subset of "xTyR" reported by the terminal by configuring one or more SRS resource sets. Here, criteria for configuring the one or more SRS resource sets are as follows.

ii-1) When a base station configures one SRS resource set for multi-panels of a terminal It is assumed that the available SRS symbol resources are sufficient as in i-1 and a terminal is capable of simultaneous activation of multiple Rx (Tx) panels, and there is no delay or very small delay in a panel switching operation for antenna switching (i.e., an operation to complete all antenna switching for each panel) so that the panel switching operation is possible within a single UL slot. In this case, a base station may configure to perform an SRS antenna switching operation for/over multiple panels within a single UL slot by configuring one SRS resource set to a terminal. That is, it may be considered to correspond to cases of the MPUE-Assumption 2 and MPUE-Assumption 3.

In this case, a configuration/indication of a base station for SRS antenna switching and an operation of a terminal may be the same as the operation of i-1 described above. Specifically, when a terminal reports capability information for SRS antenna switching for multi-panel to a base station, the terminal may report information indicating that SRS antenna switching can be completed within a single UL slot and "xTyR" for each panel (or integrated "xTyR" for a total of panels) to the base station as capability information. The corresponding base station may configure a single SRS resource set for antenna switching over multi-panel to the terminal.

Specifically, a spatial relationship information configuration (spatialRelationInfo) (or UL-TCI (transmission configuration indicator) state) of each SRS resource in one SRS resource set for SRS antenna switching for multi panels may be different from each other (unlike legacy operation). In this case, a terminal may expect SRS resources having different spatialRelationInfo (or UL-TCI state) as SRS resource configurations from different panels. Alternatively, a base station may indicate/configure that a terminal considers SRS resources having different spatialRelationInfo (or UL-TCI state) as SRS resource configurations from different panels. A configuration/transmission order in a single UL slot for antenna switching SRS resources corresponding to different panels may be defined/configured to a terminal in advance by a base station. Alternatively, a panel ID (P-ID) is configured in each SRS resource, or a P-ID is configured/linked in spatialRelationInfo (or UL-TCI state), therefore, for SRS resources in an SRS resource set, a terminal may explicitly recognize an SRS resource from which panel. When it is possible to explicitly recognize a penal of a terminal panel between a base station and a terminal, in an SRS resource set configuration for antenna switching including panel switching, a configuration of spatialRelationInfo (or UL-TCI state) of an SRS resource may be limited to only DL RS (i.e., SSB, CSI-RS). There-fore, a terminal may expect that only one and the same DL RS will be configured as the spatialRelationInfo reference RS of all SRS resources from all panels (i.e., SRS resource set). That is, an SRS (resource) beam from each panel corresponds to a transmission beam corresponding to a reception beam when a corresponding DL RS is received. In case of SRS antenna switching for each panel, a beam of an SRS resource transmitted from each panel cannot exactly correspond to the same beam. However, because all of the same DL RSs can be configured as reference RSs for (analog) beam configuration due to this configuration, a base station receives SRSs from all panels with the same reception beam, and therefore the base station can estimate DL CSI under the same conditions. Accordingly, after accurate channel estimation across multiple Rx panels of a terminal, a base station configures/indicates reception of multiple Rx panels in subsequent PDSCH scheduling so that a terminal can receive the PDSCH.

ii-2) When a base station configures a plurality of SRS resource sets for multi-panels of a terminal Different from i-1 above, it is assumed that a terminal in which cannot complete an SRS antenna switching operation for/over multi-panel within a single UL slot due to delay in a panel switching operation for antenna switching (i.e., an operation to complete all antenna switching for each panel) in units of x [ms]or n [slot]. In this case, a base station may configure a plurality of SRS resource sets to a terminal to perform an SRS antenna switching operation for/over multi panel in a plurality of UL slots in consideration of a panel switching delay. Alternatively, a terminal may expect to be configured with an SRS antenna switching operation for/over multi-panel in a plurality of UL slots. That is, it may be considered to correspond to a case of the MPUE-Assumption 1.

In this case, a configuration/instruction of a base station for SRS antenna switching and an operation of a terminal may be the same as i-2. That is, when a terminal reports capability information for SRS antenna switching for multi-panel, the terminal may report information indicating that SRS antenna switching cannot be completed within a single UL slot and "xTyR" for each panel (or integrated "xTyR" for a total of panels) to a base station as capability information. The corresponding base station may configure a plurality of SRS resource sets for antenna switching over multi-panel to the terminal. Like i-2, in order that a plurality of SRS resource sets for multi-panel are not configured/indicated for transmission in the same UL slot (e.g., in a case of periodic/semi-persistent SRS resource set), each SRS resource set may be configured to have a different period and offset value (i.e., periodicityAndOffset), or to have a different slot offset (i.e., slotOffset) (e.g., in a case of an aperiodic SRS resource set). In addition, since the same problem may occur as in i-2, the above-described methods ①, ②, and ③ may be equivalently used in ii-2.

Specifically, a spatial relation information configuration (i.e., spatialRelationInfo) (or UL-TCI state) of each SRS resource in the plurality of SRS resource sets for the plurality of panels may be different or the same, for each SRS resource set. In this case, a terminal may always expect the same spatialRelationInfo (or UL-TCI state) configuration within one SRS resource set. Alternatively, a base station may always configure the same spatialRelationInfo (or UL-TCI state) to a terminal in an SRS resource set. Through this, by completing sounding for each antenna with the same Tx beam in one panel, there is an effect that DL CSI acquisition under the same condition in one panel can be achieved.

Alternatively, a P-ID is configured for each SRS resource set or a P-ID is configured/linked in spatialRelationInfo (or UL-TCI state), and therefore, for a specific SRS resource set, a terminal may explicitly recognize an SRS resource set from which panel. When it is possible to explicitly recognize a panel of a terminal between a base station and a terminal, in a configuration of the plurality of SRS resource sets for antenna switching including panel switching, a configuration of the spatialRelationInfo (or UL-TCI state) of an SRS resource may be limited to only a DL RS (i.e., SSB, CSI-RS). Accordingly, a terminal can expect that only one and the same DL RS is configured as the spatialRelationInfo reference RS of all SRS resources from all panels (i.e., a plurality of SRS resource sets). That is, an SRS (resource set/resource) beam from each panel may be a transmission beam corresponding to a reception beam when a corresponding DL RS is received. When SRS antenna switching for each panel is performed, a beam of the SRS resource (set) transmitted from each panel cannot be exactly the same beam. However, because all of the same DL RSs can be configured as reference RSs for (analog) beam configuration due to this configuration, a base station receives SRSs from all panels with the same reception beam, and therefore the base station can estimate DL CSI under the same conditions. Accordingly, after accurate estimation across multiple Rx panels of a terminal, a base station configures/indicates reception of multiple Rx panels in subsequent PDSCH scheduling so that a terminal can receive the PDSCH.

Another embodiment of the operation ii described above will be described.

In an antenna switching operation for multi panels of a terminal, in order to support a switching operation between multiple panels and simultaneous transmission of multi panels, a base station may configure a terminal that SRS configurations from different panels correspond to different SRS resource sets. According to the current standard, since SRS power control is configured in units of SRS resource sets, it is possible to configure an SRS resource set/SRS resource corresponding, to power control for each panel through the configuration. For example, if the total UL maximum power of a terminal equipped with two panels is 23 dBm, and in the case of a terminal capable of simultaneous multi-panel transmission, power control for each panel can be performed so that the maximum power for each panel is 20 dBm.

In addition, according to the MPUE-Assumption, an SRS resource set(s) configuration for antenna switching for multi-panels of a terminal may be different by a base station. For example, in a case of a terminal capable of multi-panel simultaneous transmission such as MPUE-Assumption 2, a) a method of performing multi-panel simultaneous transmission and completing antenna switching may be performed (i.e., a method in which SRS is transmitted over a plurality of SRS resource sets in a manner in which an SRS is simultaneously transmitted on different SRS resources in different SRS resource sets (at each SRS transmission occasion), or b) after completing the antenna switching from one panel, a method of completing antenna switching in the other panel after panel switching may be performed (i.e., a method in which SRS is transmitted across a plurality of SRS resource sets in a manner in which SRS transmission for the next SRS resource set is performed after SRS transmission for one SRS resource set is completed). Terminal operations such as a and b may be switched/configured/updated/controlled by a configuration of a base station. For example, it is assumed that Rx (Tx) antenna port index (1,2) is included in panel 1 and Rx (Tx) antenna port index (3,4) is included in panel 2 in a panel configuration of a certain terminal. That is, SRS resource set 1 for panel 1 and SRS resource set 2 for panel 2 are assumed. Here, an "2T4R" antenna switching operation of a base station may be configured as follows. For example, as in case a, after SRS transmission in Rx (Tx) antenna port index (1,3) (i.e., multi-panel simultaneous transmission), it may be configured to perform SRS transmission in Rx (Tx) antenna port index (2,4) (multi-panel simultaneous transmission). Alternatively, as in case b, after SRS transmission in Rx (Tx) antenna port index (1,2) (simultaneous transmission), it may be configured to be performed SRS transmission in Rx (Tx) antenna port index (3,4) (simultaneous transmission). In a case of the operation a in the above example, two SRS resources in one panel should be located in two different symbols for simultaneous multi-panel transmission. Therefore, in SRS resource set 1 and set 2, two SRS resources representing each port index (i.e., SRS resource 1 and 2 in SRS resource set 1, SRS resource 3 and 4 in SRS resource set 2) should be configured. On the other hand, in a case of the operation b, one panel transmits simultaneously two ports and then performs panel switching. Therefore, each SRS resource set 1 and set 2 may be configured with one 2-port SRS resource, respectively. In this way, it is necessary to change base station configurations according to operation configurations/indications for a and b. Here, if a power control process is performed in units of SRS resource sets, in the case of operation a, since multi-panel simultaneous transmission is performed, SRS transmission using terminal's maximum transmission power (i.e., 23 dBm) will be possible, and in the case of operation b, since 2-port SRS resource in one SRS resource set (panel) is transmitted at one timing, SRS transmission using the maximum transmission power (i.e., 20 dBm) of a specific panel is possible. These a and b operations have an advantage that a base station can freely configure it according to a system scenario. For example, when it is determined that SRS interference is severe, a base station may configure/indicate the operation b.

Meanwhile, in a case of a terminal in which simultaneous multi-panel transmission is impossible, such as MPUE-Assumption 1 or 3, only operation b may be supported. In this case, a base station should perform an SRS resource set(s) configuration for multiple panels of a terminal for operation b.

For the operation according to the above-described embodiment, a P-ID may be implicitly/explicitly linked/configured in units of SRS resource sets.

Alternatively, as a method for a base station to switch/configure/control the operations of a and b to a terminal in the operation in the above-described embodiment, it may be controlled an operation between a and by using a method in which the base station enables/disables SRS full power (max power) transmission of a terminal (i.e., in the example above, the maximum power of 23 dBm is achieved when transmitting multi-panels with 20 dBm for each panel) while performing SRS configuration in multi-panels of a terminal (across multiple UE panels) For example, when SRS full power transmission is enabled, since full power can be achieved only by performing multiple panel simultaneous transmission, a terminal may perform the operation a. Conversely, when disabled, a terminal may perform the operation b. For this operation, a terminal may report to a base station whether or not full power transmission is supported while reporting, for example, "2T4R" related SRS antenna switching capability to a base station as related capability information. If a terminal supports full power transmission, a base station may indicate switching of operations a and b. On the other hand, if a terminal does-not support full power transmission, only operation b may be possible. Through this reporting procedure, a base station can simply perform "2T4R" related SRS configuration (with or without the full power enabler), without a base station knowing whether a terminal transmits (1,2) port and then (3,4) port, or (1,3) port transmits and then transmits (2,4) port (i.e., mapping to a specific panel with an antenna port for sounding), it is possible to leave the operation to the terminal's degree of freedom.

For the operation by the enabler, there may be no need to associate a P-ID for each SRS resource set/SRS resource.

The operation by the enabler may be used when a terminal is implemented so that the maximum power for each panel is less than terminal UL maximum power or when transmission is controlled in such a way. On the other hand, when a terminal is implemented so that a specific panel can achieve the maximum terminal UL power (it can be interpreted as a case where a default/main Tx/Rx panel exists), a base station may perform explicit switching/configuration/update/control of the operations of a and b.

After a terminal transmits SRS resource set(s) by explicit control of the operations a and b and/or the operations a and b by the enabler, a base station ma-schedule a PDSCH over a single Rx panel or a multi Rx panel to a terminal through reciprocity-based DL CSI measurement.

A terminal performs transmission for one or more SRS resource sets based on a configuration/indication of a base station as in Embodiment 6 after UE capability report as in Embodiment 5.

The above-described embodiments/proposals/methods/schemes may be independently applied in a terminal operation or may be applied in a combination of one or more embodiments/proposals/methods/schemes.

Figure 8:
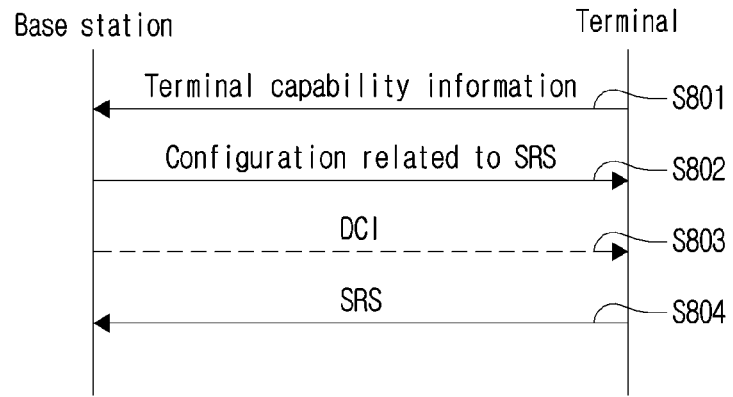
FIG. 8 is a diagram illustrating a signaling procedure between a base station and a terminal for a method of transmitting and receiving a sounding reference signal according to an embodiment of the present disclosure.

FIG. 8 is a diagram illustrating a signaling procedure between a base station and a terminal for a method of transmitting and receiving a sounding reference signal according to an embodiment of the present disclosure.

FIG. 8 exemplifies a signaling procedure between a terminal and a base station based on the previously proposed Embodiments 1 to 6. The example of FIG. 8 is for convenience of description, and does not limit the scope of the present disclosure. Some step(s) illustrated in FIG. 8 may be omitted depending on circumstances and/or configurations. In addition, a base station and a terminal in FIG. 8 are only one example, and may be implemented with the apparatus illustrated in FIGS. 11 and 12 below. For example, the processor 102/202 of FIG. 11 may control for the transceiver 106/206 to transmit and receive channel/signal/data/information (e.g., SRS-related configuration information, UL/DL scheduling) DCI, additional SRS, PDCCH, PDSCH, PUSCH, PUCCH, PHICH, etc.) and may control for the memory 104/204 to store transmitted or received channel/signal/data/information.

Referring to FIG. 8, a base station (BS) receives terminal capability information from a terminal (user equipment, UE) (S801). That is, a terminal transmits terminal capability information to a base station.

Here, terminal capability information may mean terminal capability information related to antenna switching of a terminal.

Terminal capability information may be reported to a base station through higher layer signaling (e.g., supportedSRS-TxPortSwitch).

Here, as in Example 5 above, a terminal may transmit how many Tx antennas can simultaneously transmit an SRS (i.e., Tx antenna capable of simultaneous SRS transmission) number of), how many Rx antennas it has (the number of Rx antennas a terminal has), and how many Rx antennas can perform sounding for reciprocity-based DL CSI acquisition (i.e., the number of Rx antennas for performing sounding) to a base station as terminal capability information related to antenna switching of a terminal. This information may be reported to a base station in a form of "xTyR".

In addition, a terminal may report to a base station about the number of panels related to the "xTyR" report as terminal capability information related to antenna switching of a terminal. In addition, the "xTyR" report may be individually performed for each panel.

A base station transmits configuration information related to an SRS to a terminal (S802). That is, a terminal may receive configuration information related to an SRS from a base station.

Here, as in the above-described Embodiments 1 to 6, configuration information related to an SRS includes configuration information related to SRS transmission, configuration information for one or more SRS resource sets (i.e., N (N is a natural number) SRS resource sets), etc., and each SRS resource set may include one or more SRS resources, and accordingly, configuration information may include configuration information for one or more SRS resources.

In addition, configuration information may include a usage value for each SRS resource set (or for each SRS resource) Here, a usage may include codebook (codebook), non-codebook (nonCodebook), beam management (beamManagement), antenna switching (antennaSwitching) and/or positioning (positioning), etc.

In addition, configuration information may include time domain operation (i.e., periodic transmission, aperiodic transmission, semi-persistent transmission) information for each SRS resource set (or for each SRS resource).

In addition, information on an SRS resource set (or SRS resource) in which a usage is set as antenna switching included in configuration information may be configured as a form of a subset of "xTyR" previously reported to a base station as capability information of a terminal.

In addition, as in Embodiment 6 above, in a case of information on an SRS resource set (or SRS resource) in which a usage is set as antenna switching is, the corresponding SRS resource set (or SRS resource) may be associated with one panel or may be associated with a plurality of panels.

In addition, when symbols for all SRS resources in an SRS resource set, including a gap symbol, can be included in one slot, a base station may configure one SRS resource set for a usage as antenna switching. Conversely, when symbols for all SRS resources in an SRS resource set, including a gap symbol, cannot be included in one slot, a base station may configure a plurality of SRS resource sets for a usage as antenna switching.

When a plurality of SRS resource sets are configured, each SRS resource set may be configured in different slots. Here, in a case of periodic SRS transmission or semi-persistent SRS transmission, different periods and offsets may be configured so that a plurality of SRS resource sets are transmitted in different slots. In addition, in a case of aperiodic SRS transmission, different slot offsets may be configured so that a plurality of SRS resource sets are transmitted in different slots.

In addition, as in Embodiment 6 above, the configuration information may include antenna port information for the plurality of SRS resource sets.

Here, when a plurality of SRS resource sets are configured, information on antenna port for each SRS resource set may be included. Specifically, information on antenna ports for a plurality of SRS resource sets may include information on overlapping antenna ports at different SRS transmission occasions for each of the plurality of SRS resource sets. Alternatively, information on antenna ports for a plurality of SRS resource sets may include information on antenna port groups that are rotated for each SRS transmission occasion for each of the plurality of SRS resource sets.

In addition, the configuration information may include information on antenna ports for the plurality of SRS resource sets, which may be information on antenna ports for one or more SRS resources of each of the plurality of SRS resource sets. Specifically, information on antenna ports for one or more SRS resources may include information on overlapping antenna ports at different SRS transmission occasions for the one or more SRS resources. Alternatively, information on antenna ports for one or more SRS resources may include information on antenna port groups that are rotated for each SRS transmission occasion for the one or more SRS resources.

Here, only when a plurality of SRS resource sets are configured with a usage for partial reciprocity between downlink and uplink, configuration information may include information on antenna ports for a plurality of SRS resource sets or information on antenna ports for SRS resources in a plurality of SRS resource sets as described above.

Alternatively, only when a plurality of SRS resource sets are configured corresponding to m (m is a natural number) transmissions and n (n is a natural number, n is not divisible by m) receptions (e.g., 4T6R), configuration information may include information on antenna ports for a plurality of SRS resource sets or information on antenna ports for SRS resources in a plurality of SRS resource sets as described above.

In addition, when a plurality of SRS resource sets are configured, an interval in a time domain between slots in which each SRS resource set is configured may be limited to a predetermined number of slots. Alternatively, it may be limited to the number of slots previously configured by a base station. That is, a terminal may not expect an interval greater than the predetermined number of slots.

In addition, spatial relation information for all SRS resources in a plurality of SRS resource sets may be configured identically. Alternatively, when a plurality of SRS resource sets are configured, spatial relation information for all SRS resources may be identically configured for each SRS resource set.

A base station may transmit (through a PDCCH) DCI related to SRS transmission (triggering SRS transmission) to a UE (S803). That is, a UE may receive (through a PDCCH) DCI related to SRS transmission (triggering SRS transmission) from a base station.

DCI may include information (field) that triggers SRS transmission for one or more SRS resource sets (i.e., M (M≤N, M is a natural number) SRS resource sets) among one or more SRS resource sets (i.e., N SRS resource sets) configured by configuration information.

In a case of periodic or semi-persistent SRS transmission, since it is not triggered by the DCI, step S803 may be omitted.

A terminal may transmit an SRS to a base station based on configuration information related to an SRS (S804). That is, a base station may receive an SRS from a terminal.

That is, when one or more SRS resource sets configured with a usage for antenna switching are configured by configuration information related to an SRS, a terminal may transmit an SRS to a base station across all reception antenna ports while changing an SRS antenna port for each SRS transmission occasion.

For example, in a case that the configuration information related to an SRS includes information on overlapping antenna ports at different SRS transmission occasions for each of the plurality of SRS resource sets, when an antenna port is changed for each SRS occasion when transmitting each SRS resource set, an SRS may be transmitted from an antenna port including a least the overlapping antenna ports in each SRS resource set transmission. In addition, when the configuration information related to an SRS includes information on antenna port groups that is rotated for each SRS transmission occasion for each of the plurality of SRS resource sets, an SRS may be transmitted to a base station while sequentially changing an antenna port group in each SRS resource set transmission.

As another example, in a case that the configuration information related to an SRS includes information on overlapping antenna ports at different SRS transmission occasions for the one or more SRS resources, when an antenna port is changed for each SRS occasion when transmitting one or more SRS resources, an SRS may be transmitted from an antenna port including at least the overlapping antenna ports in each SRS occasion. In addition, when the configuration information related to an SRS includes information on antenna port groups is rotated for each SRS transmission occasion for the one or more SRS resources, an SRS may be transmitted to a base station while sequentially changing an antenna port group for each SRS transmission occasion.

Figure 9:
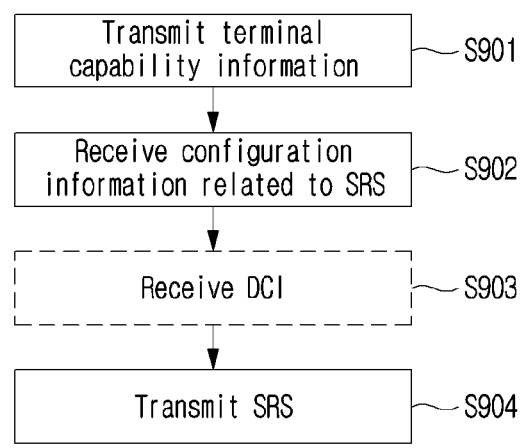
FIG. 9 is a diagram illustrating an operation of a terminal for transmitting and receiving a sounding reference signal according to an embodiment of the present disclosure.

FIG. 9 is a diagram illustrating an operation of a terminal for transmitting and receiving a sounding reference signal according to an embodiment of the present disclosure.

FIG. 9 exemplifies an operation of a terminal based on the previously proposed Embodiments 1 to 6. The example of FIG. 9 is for convenience of description, and does not limit the scope of the present disclosure. Some step(s) illustrated in FIG. 9 may be omitted depending on circumstances and/or configurations. In addition, a terminal in FIG. 9 is only one example, and may be implemented with the apparatus illustrated in FIGS. 11 and 12 below. For example, the processor 102/202 of FIG. 11 may control for the transceiver 106/206 to transmit and receive channel/signal/data/information (e.g., SRS-related configuration information, UL/DL scheduling) DCI, additional SRS, PDCCH, PDSCH, PUSCH, PUCCH, PHICH, etc.) and may control for the memory 104/204 to store transmitted or received channel/signal/data/information.

Referring to FIG. 9, a terminal transmits terminal capability information to a base station (S901). Here, terminal capability information may mean terminal capability information related to antenna switching of a terminal.

Terminal capability information may be reported to a base station through higher layer signaling (e.g., supportedSRS-TxPortSwitch)

Here, as in Example 5 above, a terminal may transmit how many Tx antennas can simultaneously transmit an SRS (i.e., Tx antenna capable of simultaneous SRS transmission) number of), how many Rx antennas it has (the number of Rx antennas a terminal has), and how many Rx antennas can perform sounding for reciprocity-based DL CSI acquisition (i.e., the number of Rx antennas for performing sounding) to a base station as terminal capability information related to antenna switching of a terminal. This information may be reported to a base station in a form of "xTyR".

In addition, a terminal may report to a base station on the number of panels related to the "xTyR" report as terminal capability information related to antenna switching of a terminal. In addition, the "xTyR" report may be individually performed for each panel.

A terminal receives configuration information related to, an SRS from a base station (S902).

Here, as in the above-described Embodiments 1 to 6, configuration information related to ai SRS includes configuration information related to SRS transmission, configuration information for one or more SRS resource sets (i.e., N (N is a natural number) SRS resource sets), etc., and each SRS resource set may include one or more SRS resources, and accordingly, configuration information may include configuration information for one or more SRS resources.

In addition, configuration information may include a usage value for each SRS resource set (or for each SRS resource). Here, a usage may include codebook (codebook), non-codebook (nonCodebook), beam management (beamManagement), antenna switching (antennaSwitching) and/or positioning (positioning), etc.

In addition, configuration information may include time domain operation (i.e., periodic transmission, aperiodic transmission, semi-persistent transmission) information for each SRS resource set (or for each SRS resource).

In addition, information on an SRS resource set (or SRS resource) in which a usage is set as antenna switching included in configuration information may be configured as a form of a subset of "xTyR" previously reported to a base station as capability information of a terminal.

In addition, as in Embodiment 6 above, in a case of information on an SRS resource set (or SRS resource) in which a usage is set as antenna switching is, the corresponding SRS resource set (or SRS resource) may be associated with one panel or may be associated with a plurality of panels.

In addition, when symbols for all SRS resources in an SRS resource set, including a gap symbol, can be included in one slot, a base station may configure one SRS resource set for a usage as antenna switching. Conversely, when symbols for all SRS resources in an SRS resource set, including a gap symbol, cannot be included in one slot, a base station may configure a plurality of SRS resource sets for a usage as antenna switching.

When a plurality of SRS resource sets are configured, each SRS resource set may be configured in different slots. Here, in a case of periodic SRS transmission or semi-persistent SRS transmission, different periods and offsets may be configured so that a plurality of SRS resource sets are transmitted in different slots. In addition, in a case of aperiodic SRS transmission, different slot offsets may be configured so that a plurality of SRS resource sets are transmitted in different slots.

In addition, as in Embodiment 6 above, the configuration information may include antenna port information for the plurality of SRS resource sets.

Here, when a plurality of SRS resource sets are configured, information on antenna port for each SRS resource set may be included. Specifically, information on antenna ports for a plurality of SRS resource sets may include information on overlapping antenna ports at different SRS transmission occasions for each of the plurality of SRS resource sets. Alternatively, information on antenna ports for a plurality of SRS resource sets may include information on antenna port groups that are rotated for each SRS transmission occasion for each of the plurality of SRS resource sets.

In addition, the configuration information may include information on antenna ports for the plurality of SRS resource sets, which may be information on antenna ports for one or more SRS resources of each of the plurality of SRS resource sets. Specifically, information on antenna ports for one or more SRS resources may include information on overlapping antenna ports at different SRS transmission occasions for the one or more SRS resources. Alternatively, information on antenna ports for one or more SRS resources may include information on antenna port groups that are rotated for each SRS transmission occasion for the one or more SRS resources.

Here, only when a plurality of SRS resource sets are configured with a usage for partial reciprocity between downlink and uplink, configuration information may include information on antenna ports for a plurality of SRS resource sets or information on antenna ports for SRS resources in a plurality of SRS resource sets as described above.

Alternatively, only when a plurality of SRS resource sets are configured corresponding to m (m is a natural number) transmissions and n (n is a natural number, n is not divisible by m) receptions (e.g., 4T6R), configuration information may include information on antenna ports for a plurality of SRS resource sets or information on antenna ports for SRS resources in a plurality of SRS resource sets as described above.

In addition, when a plurality of SRS resource sets are configured, an interval in a time domain between slots in which each SRS resource set is configured may be limited to a predetermined number of slots. Alternatively, it may be limited to the number of slots previously configured by a base station. That is, a terminal may not expect an interval greater than the predetermined number of slots.

In addition, spatial relation information for all SRS resources in a plurality of SRS resource sets may be configured identically. Alternatively, when a plurality of SRS resource sets are configured, spatial relation information for all SRS resources may be identically configured for each SRS resource set.

A terminal may receive (through a PDCCH) DCI related to SRS transmission (triggering SRS transmission) from a base station (S903).

DCI may include information (field) that triggers SRS transmission for one or more SRS resource sets (i.e., M (M≤N, M is a natural number) SRS resource sets) among one or more SRS resource sets (i.e., N SRS resource sets) configured by configuration information.

In a case of periodic or semi-persistent SRS transmission, since it is not triggered by the DCI, step S903 may be omitted.

A terminal may transmit an SRS to a base station based on configuration information related to an SRS (S904).

That is, when one or more SRS resource sets configured with a usage for antenna switching are configured by configuration information related to an SRS, a terminal may transmit an SRS to a base station across all reception antenna ports while changing an SRS antenna port for each SRS transmission occasion.

For example, in a case that the configuration information related to an SRS includes information on overlapping antenna ports at different SRS transmission occasions for each of the plurality of SRS resource sets, when an antenna port is changed for each SRS occasion when transmitting each SRS resource set, an SRS may be transmitted from an antenna port including at least the overlapping antenna ports in each SRS resource set transmission. In addition, when the configuration information related to an SRS includes information on antenna port groups that is rotated for each SRS transmission occasion for each of the plurality of SRS resource sets, an SRS may be transmitted to a base station while sequentially changing an antenna port group in each SRS resource set transmission.

As another example, in a case that the configuration information related to an SRS includes information on overlapping antenna ports at different SRS transmission occasions for the one or more SRS resources, when an antenna port is changed for each SRS occasion when transmitting one or more SRS resources, an SRS may be transmitted from an antenna port including at least the overlapping antenna ports in each SRS occasion. In addition, when the configuration information related to an SRS includes information on antenna port groups is rotated for each SRS transmission occasion for the one or more SRS resources, an SRS may be transmitted to a base station while sequentially changing an antenna port group for each SRS transmission occasion.

Figure 10:
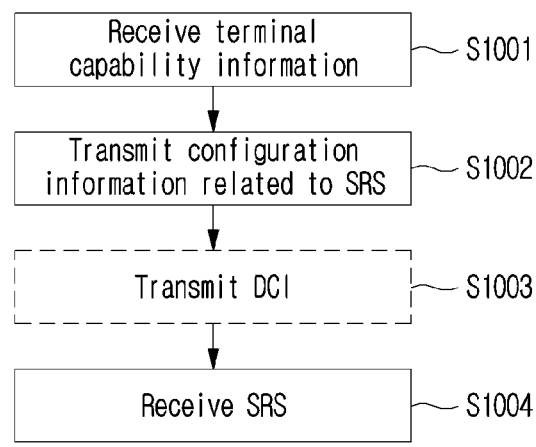
FIG. 10 is a diagram illustrating an operation of a base station for transmitting and receiving a sounding reference signal according to an embodiment of the present disclosure.

FIG. 10 is a diagram illustrating an operation of a base station for transmitting and receiving a sounding reference signal according to an embodiment of the present disclosure.

FIG. 10 exemplifies an operation of a base station based on the previously proposed Embodiments 1 to 6. The example of FIG. 10 is for convenience of description, and does not limit the scope of the present disclosure. Some step(s) illustrated in FIG. 10 may be omitted depending on circumstances and/or configurations. In addition, a base station in FIG. 10 is only one example, and may be implemented with the apparatus illustrated in FIGS. 11 and 12 below. For example, the processor 102/202 of FIG. 11 may control for the transceiver 106/206 to transmit and receive channel/signal/data/information (e.g., SRS-related configuration information, UL/DL scheduling) DCI, additional SRS, PDCCH, PDSCH, PUSCH, PUCCH, PHICH, etc.) and may control for the memory 104/204 to store transmitted or received channel/signal/data/information.

Referring to FIG. 10, a base station receives terminal capability information from a terminal (S1001). Here, terminal capability information may mean terminal capability information related to antenna switching of a terminal.

Terminal capability information may be reported to a base station through higher layer signaling (e.g., supportedSRS-TxPortSwitch)

Here, as in Example 5 above, a base station may receive how many Tx antennas can simultaneously transmit an SRS (i.e., Tx antenna capable of simultaneous SRS transmission) number of), how many Rx antennas it has (the number of Rx antennas a terminal has), and how many Rx antennas can perform sounding for reciprocity-based DL CSI acquisition (i.e., the number of Rx antennas for performing sounding) from a terminal as terminal capability information related to antenna switching of a terminal. This information may be reported to a base station in a form of "xTyR".

In addition, a base station may receive from a terminal on the number of panels related to the "xTyR" report as terminal capability information related to antenna switching of a terminal. In addition, the "xTyR" report may be individually performed for each panel.

A base station transmits configuration information related to an SRS to a terminal (S1002).

Here, as in the above-described Embodiments 1 to 6, configuration information related to an SRS includes configuration information related to SRS transmission, configuration information for one or more SRS resource sets (i.e., N (N is a natural number) SRS resource sets), etc., and each SRS resource set may include one or more SRS resources, and accordingly, configuration information may include configuration information for one or more SRS resources.

In addition, configuration information may include a usage value for each SRS resource set (or for each SRS resource). Here, a usage may include codebook (codebook), non-codebook (nonCodebook), beam management (beamManagenent), antenna switching (antennaSwitching) and/or positioning (positioning), etc.

In addition, configuration information may include time domain operation (i.e., periodic transmission, aperiodic transmission, semi-persistent transmission) information for each SRS resource set (or for each SRS resource).

In addition, information on an SRS resource set (or SRS resource) in which a usage is set as antenna switching included in configuration information may be configured as a form of a subset of "xTyR" previously reported to a base station as capability information of a terminal.

In addition, as in Embodiment 6 above, in a case of information on an SRS resource set (or SRS resource) in which a usage is set as antenna switching is, the corresponding SRS resource set (or SRS resource) may be associated with one panel or may be associated with a plurality of panels.

In addition, when symbols for all SRS resources in an SRS resource set, including a gap symbol, can be included in one slot, a base station may configure one SRS resource set for a usage as antenna switching. Conversely, when symbols for all SRS resources in an SRS resource set, including a gap symbol, cannot be included in one slot, a base station may configure a plurality of SRS resource sets for a usage as antenna switching.

When a plurality of SRS resource sets are configured, each SRS resource set may be configured in different slots. Here, in a case of periodic SRS transmission or semi-persistent SRS transmission, different periods and offsets may be configured so that a plurality of SRS resource sets are transmitted in different slots. In addition, in a case of aperiodic SRS transmission, different slot offsets may be configured so that a plurality of SRS resource sets are transmitted in different slots.

In addition, as in Embodiment 6 above, the configuration information may include antenna port information for the plurality of SRS resource sets.

Here, when a plurality of SRS resource sets are configured, information on antenna port for each SRS resource set may be included. Specifically, information on antenna ports for a plurality of SRS resource sets may include information on overlapping antenna ports at different SRS transmission occasions for each of the plurality of SRS resource sets. Alternatively, information on antenna ports for a plurality of SRS resource sets may include information on antenna port groups that are rotated for each SRS transmission occasion for each of the plurality of SRS resource sets.

In addition, the configuration information may include information on antenna ports for the plurality of SRS resource sets, which may be information on antenna ports for one or more SRS resources of each of the plurality of SRS resource sets. Specifically, information on antenna ports for one or more SRS resources may include information on overlapping antenna ports at different SRS transmission occasions for the one or more SRS resources. Alternatively, information on antenna ports for one or more SRS resources may include information on antenna port groups that are rotated for each SRS transmission occasion for the one or more SRS resources.

Here, only when a plurality of SRS resource sets are configured with a usage for partial reciprocity between downlink and uplink, configuration information may include information on antenna ports for a plurality of SRS resource sets as described above.

Alternatively, only when a plurality of SRS resource sets are configured corresponding to m (m is a natural number) transmissions and n (n is a natural number, n is not divisible by m) receptions (e.g., 4T6R), configuration information may include information on antenna ports for a plurality of SRS resource sets as described above.

In addition, when a plurality of SRS resource sets are configured, an interval in a time domain between slots in which each SRS resource set is configured may be limited to a predetermined number of slots. Alternatively, it may be limited to the number of slots previously configured by a base station. That is, a terminal may not expect an interval greater than the predetermined number of slots.

In addition, spatial relation information for all SRS resources in a plurality of SRS resource sets may be configured identically. Alternatively, when a plurality of SRS resource sets are configured, spatial relation information for all SRS resources may be identically configured for each SRS resource set.

A base station may transmit DCI related to SRS transmission (triggering SRS transmission) to a UE (through a PDCCH) (S1003).

DCI may include information (field) that triggers SRS transmission for one or more SRS resource sets (i.e., M (M≤N, M is a natural number) SRS resource sets) among one or more SRS resource sets (i.e., N SRS resource sets) configured by configuration information.

In a case of periodic or semi-persistent SRS transmission, since it is not triggered by the DCI, step S1003 may be omitted.

A base station may receive an SRS from a terminal (S1004).

In addition, a base station may measure an SRS received from a terminal, and may perform scheduling of a DL signal/channel to a UE based on measurement for an SRS by assuming DL/UL reciprocity.

General Device to which the Present Disclosure May be Applied

Figure 11:
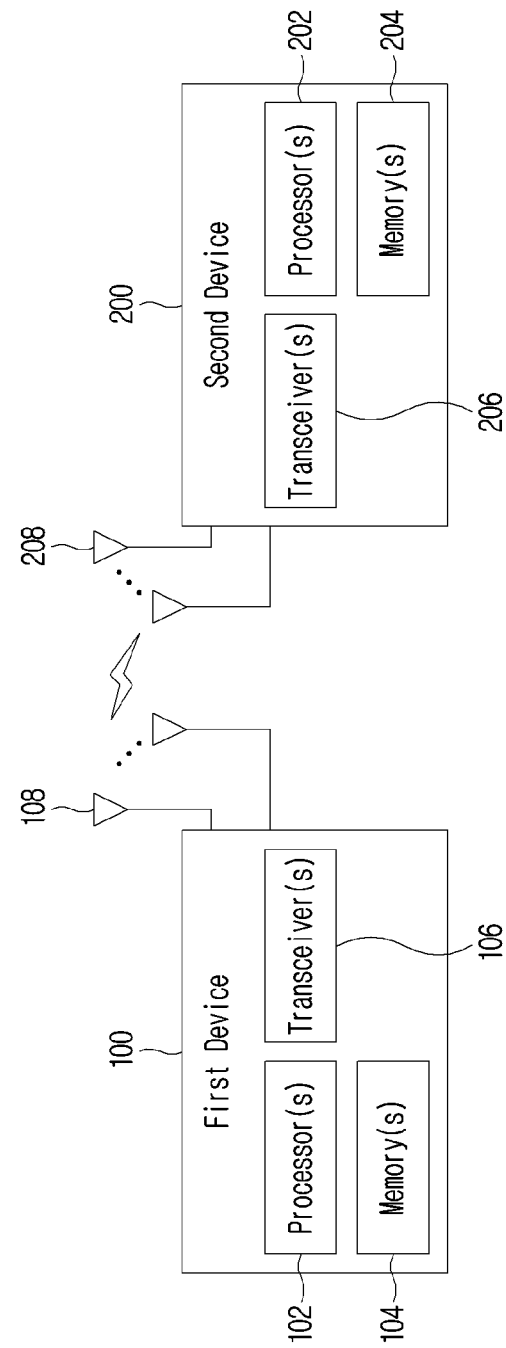
FIG. 11 illustrates a block diagram of a wireless communication device according to an embodiment of the present disclosure.

FIG. 11 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories' 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 12:
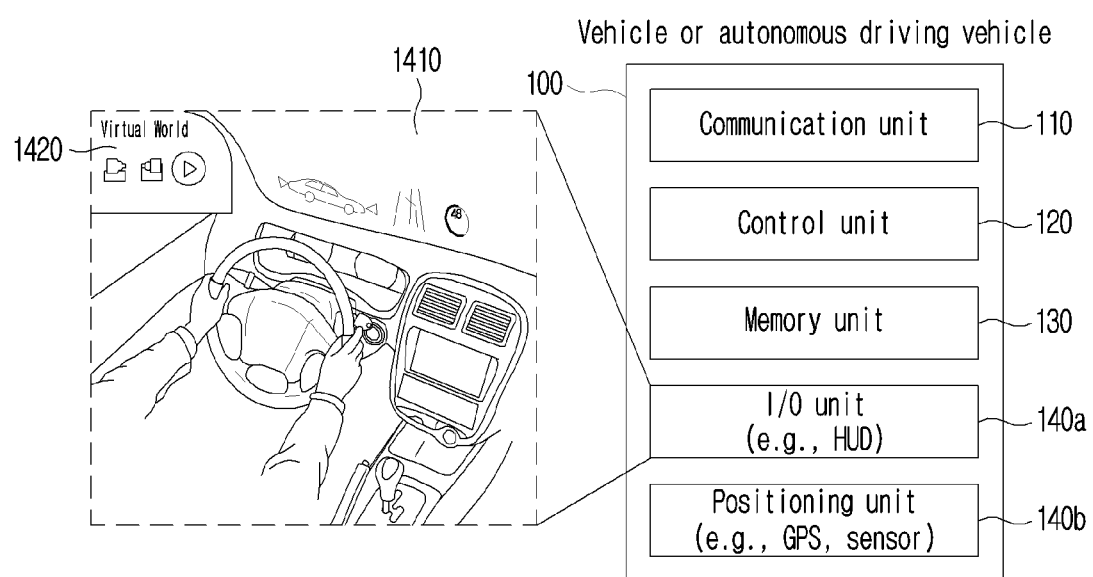
FIG. 12 illustrates a vehicle device according to an embodiment of the present disclosure.

FIG. 12 illustrates a vehicle device according to an embodiment of the present disclosure.

In reference to FIG. 12, a vehicle 100 may include a communication unit 110, a control unit 120, a memory unit 130, an input and output unit 140a and a positioning unit 140b.

A communication unit 110 may transmit and receive a signal (e.g., data, a control signal, etc.) with external devices, of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140a may output an AR/VR object based on information in a memory unit 130. An input and output unit 140a may include HUD. A positioning unit 140b may obtain position information of a vehicle 100. Position information may include absolute position information, position information in a driving lane, acceleration information, position information with a surrounding vehicle, etc. of a vehicle 100. A positioning unit 140b may include a GPS and a variety of sensors.

In an example, a communication unit 110 of a vehicle 100 may receive map information, traffic information, etc. from an external server and store them in a memory unit 130. A positioning unit 140b may obtain vehicle position information through a GPS and a variety of sensors and store it in a memory; unit 130. A control unit 120 may generate a virtual object based on map information, traffic information and vehicle position information, etc. and an input and output unit 140a may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140a. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
transmitting, by a terminal, to a base station, terminal capability information related to antenna switching;
receiving, by the terminal, from the base station, configuration information related to a sounding reference signal; and
transmitting, by the terminal, to the base station, the sounding reference signal based on the configuration information,
wherein the configuration information includes information on a plurality of sounding reference signal resource sets in which usage is configured for antenna switching,
wherein the configuration information includes information on antenna ports for one or more sounding reference signal resources included in each of the plurality of sounding reference signal resource sets,
wherein each of the plurality of sounding reference signal resource sets is transmitted in a different slot and all sounding reference signal resources in the plurality of sounding reference signal resource sets are transmitted during different sounding reference signal transmission occasions, and
wherein a time interval between slots in which the plurality of sounding reference signal resource sets are transmitted is configured so that the plurality of sounding reference signal resource sets are transmitted within a predetermined number of slots, and
wherein the same antenna port is configured for some sounding reference signal resources of all the sounding reference signal resources by the configuration information.

2. The method of claim 1, wherein the configuration information includes information on an antenna port group that is rotated for each sounding reference signal transmission occasion for each of the plurality of sounding reference signal resource sets.

3. The method of claim 1, wherein the information on antenna ports for the one or more sounding reference signal resources includes information on an antenna port group that is rotated for each sounding reference signal transmission occasion for the one or more sounding reference signal resources.

4. The method of claim 1, wherein spatial relation information for all sounding reference signal resources in the plurality of sounding reference signal resource sets or in each of the plurality of sounding reference signal resource sets is configured identically.

5. The method of claim 1, wherein based on the plurality of sounding reference signal resource sets being configured with a usage for partial reciprocity between downlink and uplink, the configuration information includes information on antenna ports for one or more sounding reference signal resources included in each of the plurality of sounding reference signal resource sets.

6. The method of claim 1, wherein based on the plurality of sounding reference signal resource sets being configured to correspond to m transmission and n reception, the configuration information includes information on antenna ports for one or more sounding reference signal resources included in each of the plurality of sounding reference signal resource sets, and
wherein m is an integer greater than 0, n is an integer equal to or greater than m, and n is not divisible by m.

7. The method of claim 1, wherein, for periodic sounding reference signal transmission or semi-persistent sounding reference signal transmission, different periods and offsets are configured for the plurality of sounding reference signal resource sets so that the plurality of sounding reference signal resource sets are transmitted in different slots.

8. The method of claim 1, wherein, for aperiodic sounding reference signal transmission, different slot offsets are configured for the plurality of sounding reference signal resource sets so that the plurality of sounding reference signal resource sets are transmitted in different slots.

9. The method of claim 1, wherein each of the plurality of sounding reference signal resource sets is related to a different panel of the terminal.

10. A terminal comprising:
at least one transceiver for transmitting and receiving a wireless signal; and
at least one processor for controlling the at least one transceiver,
wherein the at least one processor configured to:
transmit, to a base station, terminal capability information related to antenna switching;
receive, from the base station, configuration information related to a sounding reference signal; and
transmit, to the base station, the sounding reference signal based on the configuration information,
wherein the configuration information includes information on a plurality of sounding reference signal resource sets in which usage is configured for antenna switching,
wherein the configuration information includes information on antenna ports for one or more sounding reference signal resources included in each of the plurality of sounding reference signal resource sets,
wherein each of the plurality of sounding reference signal resource sets is transmitted in a different slot and all sounding reference signal resources in the plurality of sounding reference signal resource sets are transmitted during different sounding reference signal transmission occasions, and
wherein a time interval between slots in which the plurality of sounding reference signal resource sets are transmitted is configured so that the plurality of sounding reference signal resource sets are transmitted within a predetermined number of slots, and
wherein the same antenna port is configured for some sounding reference signal resources of all the sounding reference signal resources by the configuration information.

11. A method comprising:
receiving, by a base station, from a terminal, terminal capability information related to antenna switching;
transmitting, by the base station, to the terminal, configuration information related to a sounding reference signal; and
receiving, by the base station, from the terminal, the sounding reference signal based on the configuration information,
wherein the configuration information includes information on a plurality of sounding reference signal resource sets in which usage is configured for antenna switching,
wherein the configuration information includes information on antenna ports for one or more sounding reference signal resources included in each of the plurality of sounding reference signal resource sets,
wherein each of the plurality of sounding reference signal resource sets is transmitted in a different slot and all sounding reference signal resources in the plurality of sounding reference signal resource sets are transmitted during different sounding reference signal transmission occasions, and
wherein a time interval between slots in which the plurality of sounding reference signal resource sets are transmitted is configured so that the plurality of sounding reference signal resource sets are transmitted within a predetermined number of slots, and
wherein the same antenna port is configured for some sounding reference signal resources of all the sounding reference signal resources by the configuration information.

* * * * *